(12) United States Patent
Ansari et al.

(10) Patent No.: US 12,536,681 B2
(45) Date of Patent: Jan. 27, 2026

(54) EFFECTIVE LEVERAGING OF SYNTHETIC DATA FOR DEPTH ESTIMATION MACHINE LEARNING MODELS

(71) Applicant: QUALCOMM Incorporated, San Diego, CA (US)

(72) Inventors: Amin Ansari, Federal Way, WA (US); Sai Madhuraj Jadhav, San Diego, CA (US); Avdhut Joshi, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/311,640

(22) Filed: May 3, 2023

(65) Prior Publication Data

US 2024/0371015 A1    Nov. 7, 2024

(51) Int. Cl.
*G06T 7/50* (2017.01)
*G06N 20/00* (2019.01)

(52) U.S. Cl.
CPC .............. *G06T 7/50* (2017.01); *G06N 20/00* (2019.01); *G06T 2207/20081* (2013.01)

(58) Field of Classification Search
None
See application file for complete search history.

(56) References Cited

U.S. PATENT DOCUMENTS

2023/0023126 A1    1/2023    Ansari et al.

FOREIGN PATENT DOCUMENTS

| CN | 112784920 A | * | 5/2021 | .......... G06F 18/213 |
| KR | 102808131 B1 | * | 5/2025 | |
| TW | I840640 B | * | 5/2024 | |

OTHER PUBLICATIONS

Zhao et al, Geometry-Aware Symmetric Domain Adaptation for Monocular Depth Estimation, 2019.*
Hornauer et al, Visual Domain Adaptation for Monocular Depth Estimation on Resource-Constrained Hardware, 2022.*
International Search Report and Written Opinion—PCT/US2024/026566—ISA/EPO—Aug. 5, 2024.
Zhao S., et al., "Geometry-Aware Symmetric Domain Adaptation for Monocular Depth Estimation," 2019 IEEE/CVF Conference on Computer Vision and Pattern Recognition (CVPR), IEEE, Jun. 15, 2019, pp. 9780-9790, XP033686751, The whole document.

* cited by examiner

*Primary Examiner* — Fan Zhang
(74) *Attorney, Agent, or Firm* — QUALCOMM Incorporated

(57) ABSTRACT

Certain aspects of the present disclosure provide techniques and apparatus for improved machine learning. Data from a source domain and data from a target domain is accessed. A set of machine learning models is trained, based on the data from the source domain and the data from the target domain, to generate depth outputs based on input images. Training the set of machine learning models includes: generating a discriminator output based at least in part on an input image frame from either the source domain or the target domain, generating an adversarial loss based on the discriminator output, and refining one or more machine learning models of the set of machine learning models based on the adversarial loss.

30 Claims, 10 Drawing Sheets

EFFECTIVE LEVERAGING OF SYNTHETIC DATA FOR DEPTH ESTIMATION MACHINE LEARNING MODELS

INTRODUCTION

Aspects of the present disclosure relate to machine learning.

Machine learning has revolutionized many aspects of computer vision. Yet, estimating the depth of objects in image data remains a challenging computer vision task relevant to many useful ends. For example, depth estimation based on image data is useful in autonomous and semi-autonomous systems, such as self-driving automobiles and semi-autonomous drones, to perceive and navigate environments and to estimate state.

Training machine learning models for depth estimation is generally performed using supervised machine learning techniques, which typically involve using significant amounts of well-prepared training data (e.g., training data with accurate distance labels at a pixel level for captured images). Unfortunately, in many real-world applications, such data is generally not readily available and is difficult or impossible to acquire. At best, training data with sparse or high-level labels may be available (e.g., with distances indicated for a few specific objects in the scene, rather than for each pixel). Thus, it is difficult, if not impossible in practice, to train high-performance models for depth estimation in many contexts.

BRIEF SUMMARY

Certain aspects of the present disclosure provide a processor-implemented method, comprising: accessing data from a source domain and data from a target domain; and training a set of machine learning models, based on the data from the source domain and the data from the target domain, to generate depth outputs based on input images, comprising: generating a discriminator output from a discriminator component based at least in part on an input image frame from either the source domain or the target domain; generating an adversarial loss based on the discriminator output and a first ground truth for the input image frame, the first ground truth indicating whether the input image frame is from the source domain or the target domain; and refining one or more machine learning models of the set of machine learning models based on the adversarial loss.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
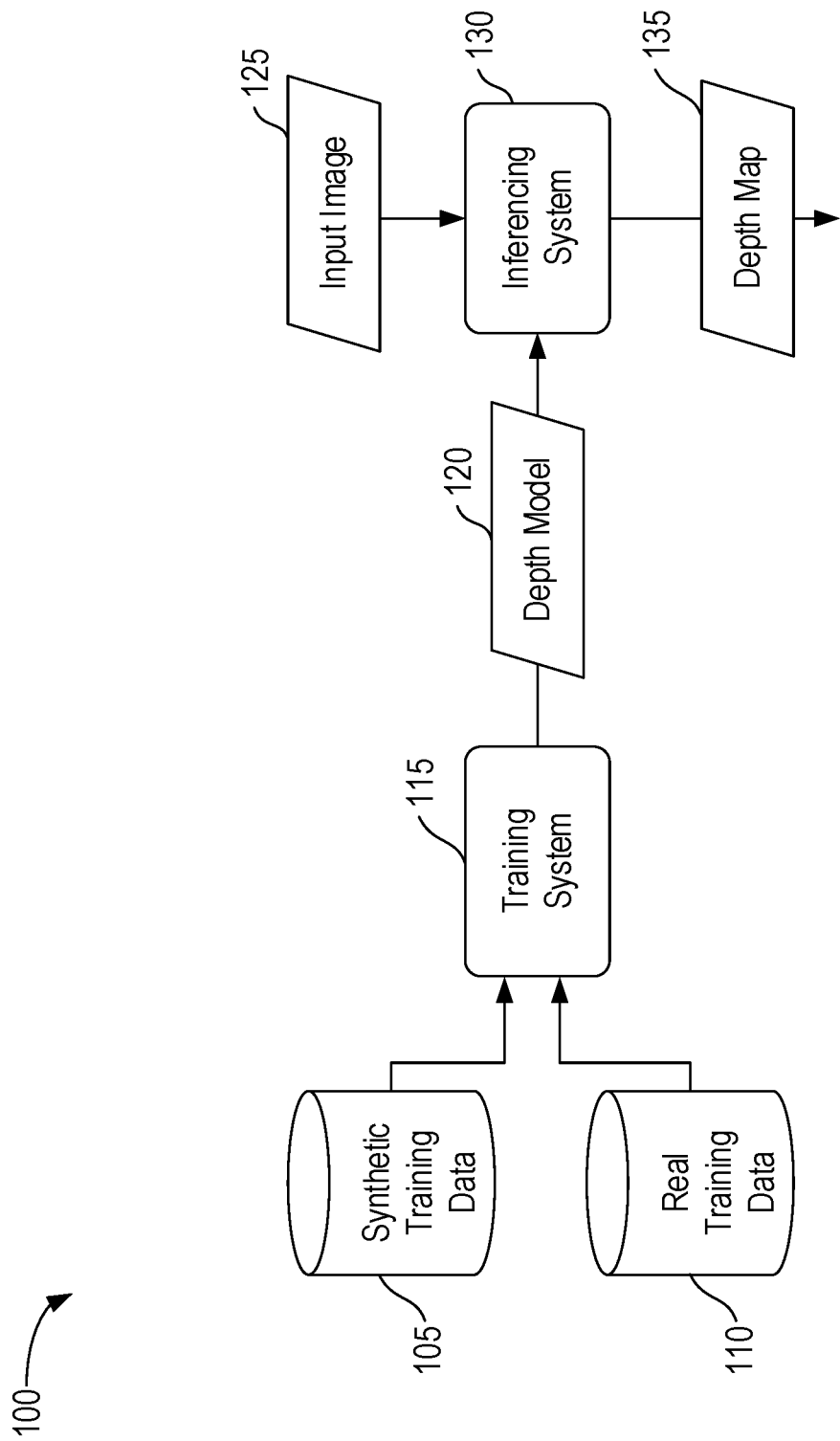
FIG. 1 depicts an example workflow for training depth models using real and synthetic training data, and using trained depth models to generate depth maps for input images.

Aspects of the present disclosure provide apparatuses, methods, processing systems, and non-transitory computer-readable mediums for providing improved supervision in monocular depth estimation machine learning models.

Estimating depth information in image data is an important task in computer vision applications, which can be used in simultaneous localization and mapping (SLAM), navigation, object detection, and semantic segmentation, to name just a few examples. For example, depth estimation is useful for obstacle avoidance (e.g., for drones flying (semi-) autonomously, cars driving (semi-) autonomously or with assistance, warehouse robots operating (semi-) autonomously, household and other robots generally moving (semi-) autonomously, 3D construction of an environment, spatial scene understanding, and other examples.

Traditionally, depth has been estimated using binocular (or stereo) image sensor arrangements based on calculating the disparity between corresponding pixels in different binocular images. For example, in simple cases, depth d may be calculated between corresponding points according to $$d = \left(\frac{b * f}{\delta}\right),$$

where b is the baseline distance between the image sensors, f is the focal length of the image sensors, and $\delta$ is the disparity between the points, as depicted in each of the images. However, in cases in which there is only one perspective, such as a single image sensor, traditional stereoscopic methods cannot be used. Such cases may be referred to as "monocular depth estimation." Additionally, stereo or binocular estimation entails additional sensors, as well as careful calibration, thereby reducing accuracy and/or applicability.

Method based on direct depth sensing may also be used to provide depth information. For example, red, green, blue, and depth (RGB-D) cameras and light detection and ranging (LIDAR) sensors may be used to estimate depth directly. However, RGB-D cameras may suffer from limited measurement range and bright light sensitivity, and LIDAR may only be able to generate sparse 3D depth maps, which are of much lower resolutions than any corresponding image data. Further, the large size and power consumption of such sensing systems make them undesirable for many applications, such as drones, robots, and automobiles. By contrast, monocular image sensors (e.g., cameras) tend to be low cost, small in size, and low power, which makes such sensors desirable in a wide variety of applications.

Monocular depth estimation has proven challenging in at least some conventional solutions, as neither the well-understood math of binocular depth estimation nor direct sensing can be used in such scenarios. Nevertheless, some deep-learning-based methods have been developed for performing depth estimation in a monocular context. For example, structure from motion (SfM) techniques have been developed to determine the depth of objects in monocular image data based on analyzing how features move across a series of images.

In some conventional systems, models for monocular depth estimation have been trained using self-supervision, where the temporal axis is used to infer depth (e.g., based on SfM). Such self-supervision is often important due to the difficult nature of the problem, where little (or no) ground-truth depth information is available for real-world image data. Some conventional solutions introduce partial supervision, which often relies mainly on self-supervision, with the addition of full supervision (e.g., ground-truth depth) for a small subset of training samples and/or for a small subset of pixels in the training images. While such approaches can improve the model accuracy, these approaches remain substantially limited.

Some conventional approaches have sought to provide full supervision by generating synthetic image data and corresponding ground-truth depth information using three-dimensional modeling and rendering. Advantageously, generating such ground-truth information is easy and uses minimal computational resources (e.g., because the entire three-dimensional virtual scene already exists in the computer, determining the depth of any given object or pixel from a camera object is trivial). Further, such ground-truth information is highly accurate and granular (e.g., providing depth for each individual pixel), which is practically impossible for real-world data. Moreover, time synchronization is not a concern, as the depth information can be easily generated for each specific rendered or synthetic image. However, use of such synthetic data has been shown to result in poor accuracy of depth estimation models when real-world image data is used during runtime. This may be due at least in part to the source domain (e.g., synthetic images) and the target domain (e.g., real images) differing substantially (even when high fidelity synthetic images are created).

Aspects of the present disclosure present techniques to reduce or eliminate these concerns using domain adaptation approaches that account for the differences in distributions of the source and target domains. Beneficially, aspects described herein eliminate the perceived need for large, curated real-world datasets, and instead rely on synthetic data for at least a portion of model training using a combination of full supervision and self-supervision. This enables training of a wider variety of models for a wider variety of tasks without the limitations of existing datasets.

Moreover, aspects described herein overcome limitations of conventional depth estimation techniques by generating additional supervisory signals using adversarial loss to control for domain differences. Accordingly, aspects described herein provide improved training techniques for generating improved monocular depth estimation models, as compared to conventional techniques. Some aspects of the present disclosure provide such improvements by enabling techniques for using synthetic data, along with real data, and adversarial training to train depth estimation models, as discussed in more detail below.

Example Workflow for Training Depth Models Using Real and Synthetic Training Data, and Using Trained Depth Models to Generate Depth Maps for Input Images FIG. 1 depicts an example workflow 100 for training depth models using real and synthetic training data, and using trained depth models to generate depth maps for input images.

In the illustrated example, synthetic training data 105 and real training data 110 are accessed by a training system 115 and used to train a depth model 120. As used herein, "accessing" data may generally include a variety of operations, including receiving, requesting, retrieving, obtaining, or otherwise gaining access to the data. The synthetic training data 105 and real training data 110 each generally include image data that can be used to train machine learning models (e.g., depth model 120) to generate depth maps (also referred to in some aspects as "depth output") reflecting the predicted or estimated depth(s) of all or a portion of input images.

In some aspects, the synthetic training data 105 corresponds to simulated or computer-generated data (e.g., computer renderings of a three-dimensional virtual model or scene), while the real training data 110 corresponds to actual or real-world images (e.g., images of a real physical object or environment captured using one or more image sensors). Although depicted as residing in separate repositories for conceptual clarity, in some aspects, the synthetic training data 105 and real training data 110 may be maintained in any number of repositories (including a single repository). Additionally, though depicted as remote from the training system, in some aspects, some or all of the synthetic training data 105 and real training data 110 may be stored locally by the training system 115.

In some aspects, the synthetic training data 105 may be referred to as "source domain data," while the real training data 110 may be referred to as "target domain data." In some aspects, the synthetic training data 105 may include ground-truth depth information, while some or all of the real training data 110 lacks such ground truth. For example, as each image in the synthetic training data 105 is computer generated (e.g., by rendering a two-dimensional perspective image from a virtual three-dimensional environment), the ground-truth depth of each respective pixel in the image can be readily determined by determining the distance between the position from which the image was rendered (e.g., the position of the virtual camera) and the object/surface depicted by the respective pixel. In this way, the synthetic training data 105 may include dense or granular ground truth.

In some aspects, in contrast to the synthetic training data 105, the real training data 110 may lack such dense ground-truth information. For example, as discussed above, it may be impossible (or at least extremely impractical) to generate such pixel-specific depth information for real scenes. In some aspects, some or all of the images in the real training data 110 lack ground-truth information entirely (e.g., depth information is not known for any portion of the image). In some aspects, some or all of the images in the real training data 110 may include partial ground-truth information (e.g., depth information for a subset of the pixels in the image). For example, one or more ranging techniques such as LIDAR or radar may be used to determine depth/distance to one or more objects (while an image of the environment is being captured). These distances may then be used to provide ground truth for the subset of pixels, in the image, that depict the object(s).

As discussed above, training the depth model 120 based solely on real training data 110 may result in unsatisfactory accuracy, as the real training data 110 generally lack full ground truth and therefore cannot be used for fully supervised training (which generally results in more accurate models). However, training the depth model 120 based solely on synthetic training data 105 may similarly result in unsatisfactory accuracy, as the synthetic training data 105 often differs from real image data in ways that substantially effect model performance, despite the benefits of fully supervised training. In the illustrated example, therefore, the training system 115 can use a combination of synthetic training data 105 and real training data 110 to train the depth model 120.

Though depicted as a discrete system for conceptual clarity, in some aspects, the training system 115 may be implemented using one or more components of one or more other systems, and may be implemented using hardware, software, or a combination of hardware and software. In the illustrated workflow 100, the training system 115 may use a variety of techniques to leverage synthetic training data 105 and real training data 110 while accounting for differences in domain distributions to generate depth models 120 that exhibit improved prediction accuracy, as compared to at least some conventional approaches.

Figure 6:
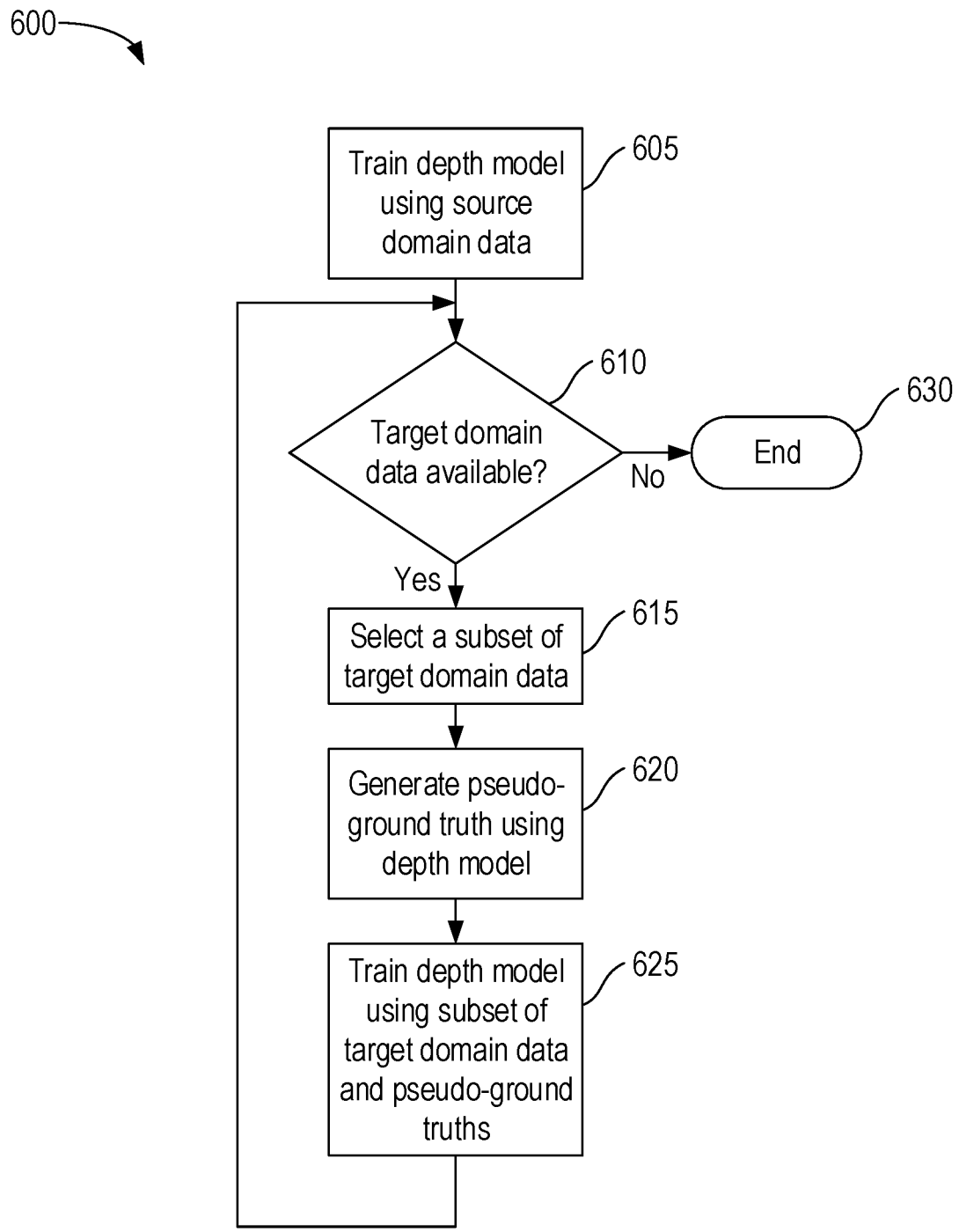
FIG. 6 is a flow diagram depicting an example method for training depth models based on real and synthetic data using an iterative approach.
Figure 7:
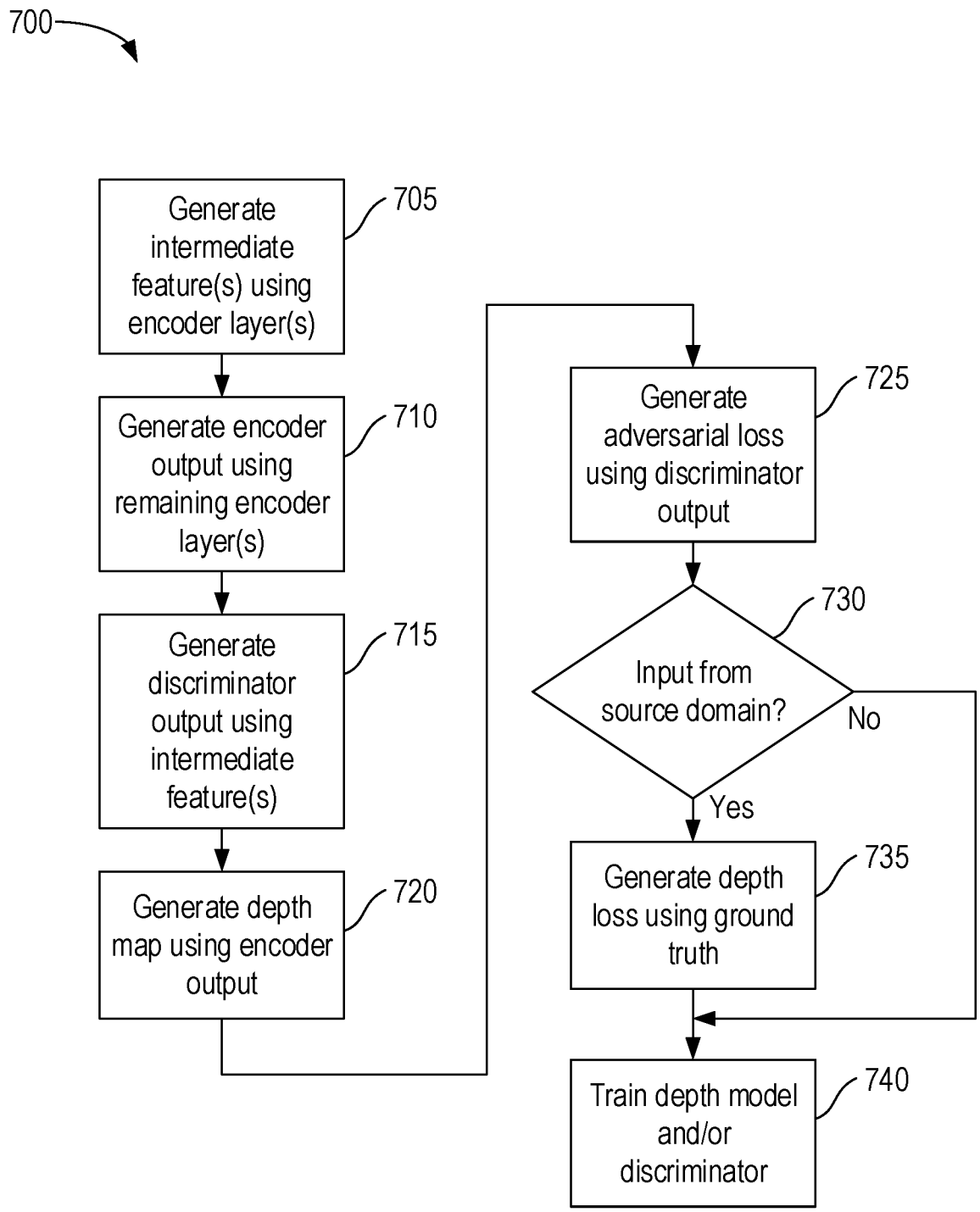
FIG. 7 is a flow diagram depicting an example method for training depth models based on real and synthetic data using adversarial loss.
Figure 8:
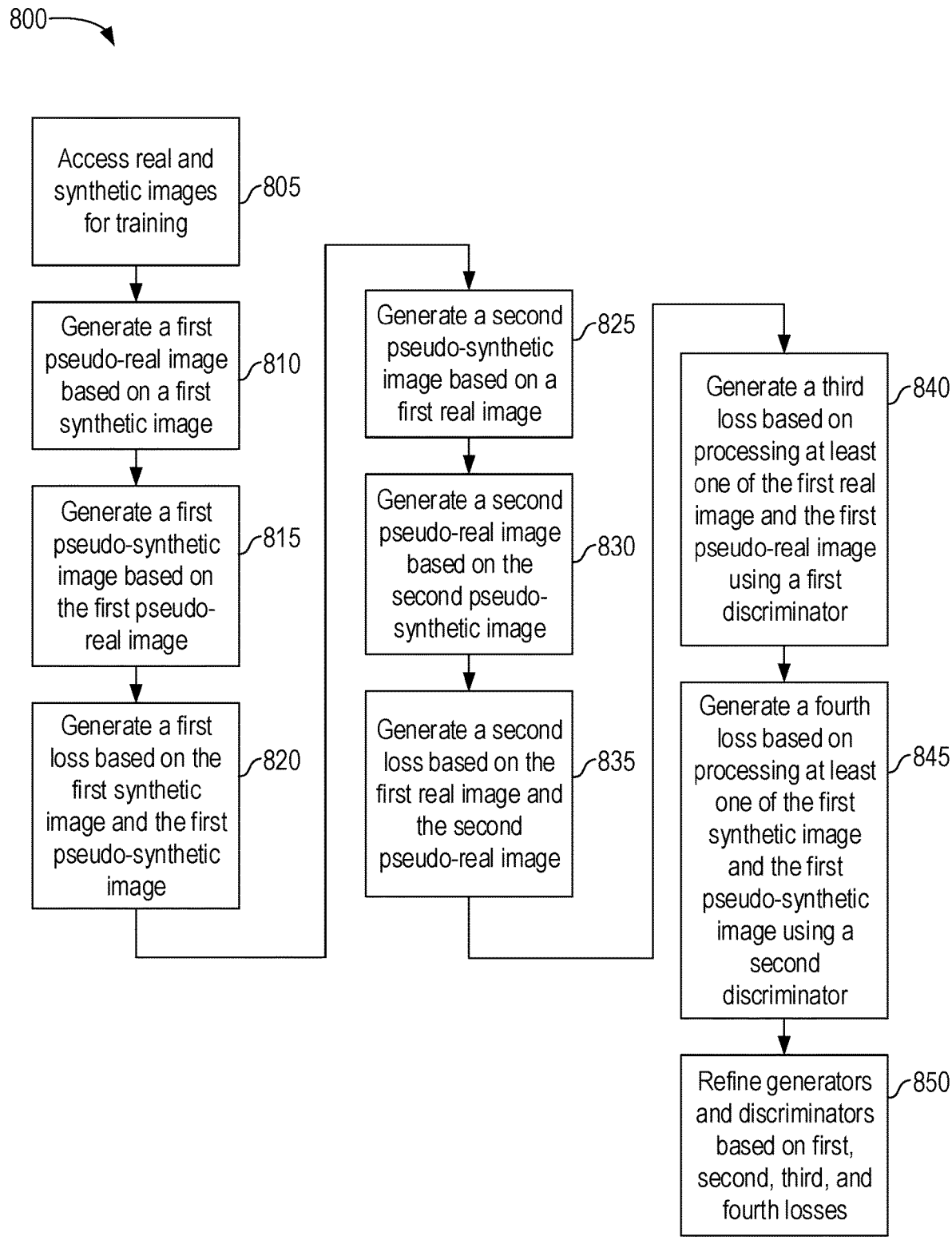
FIG. 8 is a flow diagram depicting an example method for training cycle generative adversarial networks to enable depth model training based on synthetic data.
Figure 9:
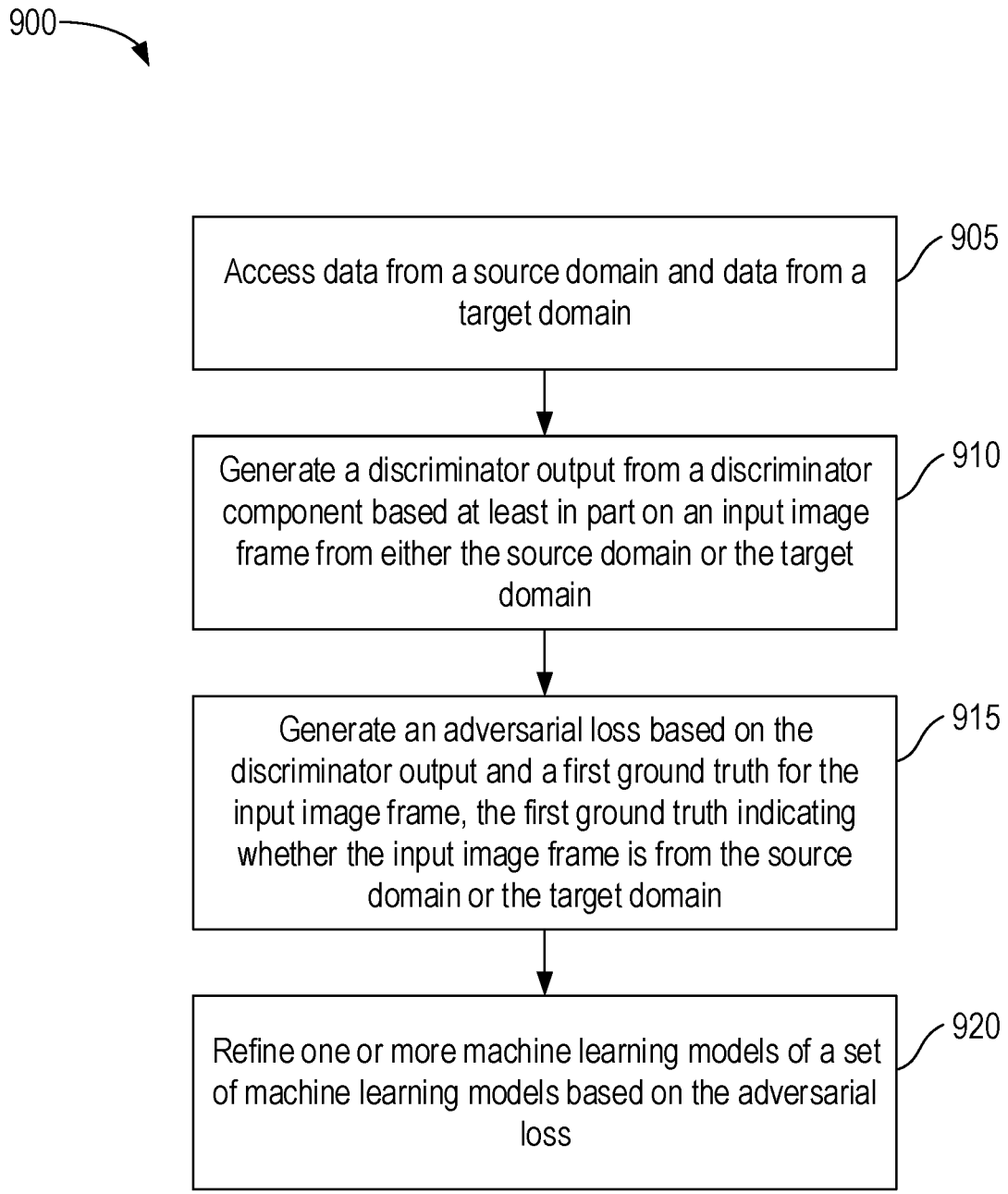
FIG. 9 is a flow diagram depicting an example method for training depth models.

Generally, the specific techniques used by the training system 115 may vary depending on the particular implementation. For example, in some aspects, the training system 115 may use adversarial adaptation to train depth models 120 using both synthetic training data 105 and real training data 110, as discussed in more detail below with reference to FIGS. 2, 3, and 7. In some aspects, the training system 115 may use a cycle generative adversarial network (GAN) approach using both synthetic training data 105 and real training data 110, as discussed in more detail below with reference to FIGS. 4 and 8. In some aspects, the training system 115 may use dynamic sample weighting to balance domain distributions across the synthetic training data 105 and real training data 110, as discussed in more detail below with reference to FIG. 5. In some aspects, the training system 115 may use an iterative approach to train depth models 120 using both synthetic training data 105 and real training data 110, as discussed in more detail below with reference to FIG. 6.

In the illustrated example, once trained, the depth model 120 is deployed to an inferencing system 130 for runtime use. Although depicted as a discrete system for conceptual clarity, in some aspects, the inferencing system 130 may be implemented using one or more components of one or more other systems, and may be implemented using hardware, software, or a combination of hardware and software. Additionally, though depicted separately from the training system 115, in some aspects, the inferencing system 130 and training system 115 may be implemented on a single system or device. That is, the depth model 120 may be trained on a first system and used by a second system for inferencing, or may be trained and used for inferencing by a single system. In some aspects, the inferencing system 130 corresponds to or is included in a mobile computing environment, such as an autonomous vehicle that uses captured images to navigate its environment.

In the illustrated example, the inferencing system 130 accesses input images 125 and processes these images using the depth model 120 to generate corresponding depth maps 135. In some aspects, as discussed above, the input images 125 correspond to image data depicting a real or physical environment and captured by one or more imaging sensors (e.g., cameras). The depth map 135 generally includes predicted or estimated depth information for one or more regions, portions, or pixels of the input image 125. That is, the depth map 135 may indicate, for each respective region, portion, or pixel, a respective predicted or estimated distance between the source of the input image 125 (e.g., the camera) and the object or surface depicted by the respective region, portion, or pixel.

In some aspects, the inferencing system 130 can use the depth model 120 to process input images 125 repeatedly (e.g., several times a second) to continue to generate new depth maps 135, allowing a variety of corresponding processes to be performed based on the predicted distances. For example, as discussed above, the inferencing system 130 (or another system or component) may use the depth maps 135 to perform autonomous or assisted navigation, driving, flying, and the like.

Advantageously, because the training system 115 uses both synthetic training data 105 and real training data 110 (along with various adaptation techniques), the resulting depth models 120 can provide improved accuracy and reliability in the depth maps 135, as compared to at least some conventional systems.

Figure 2:
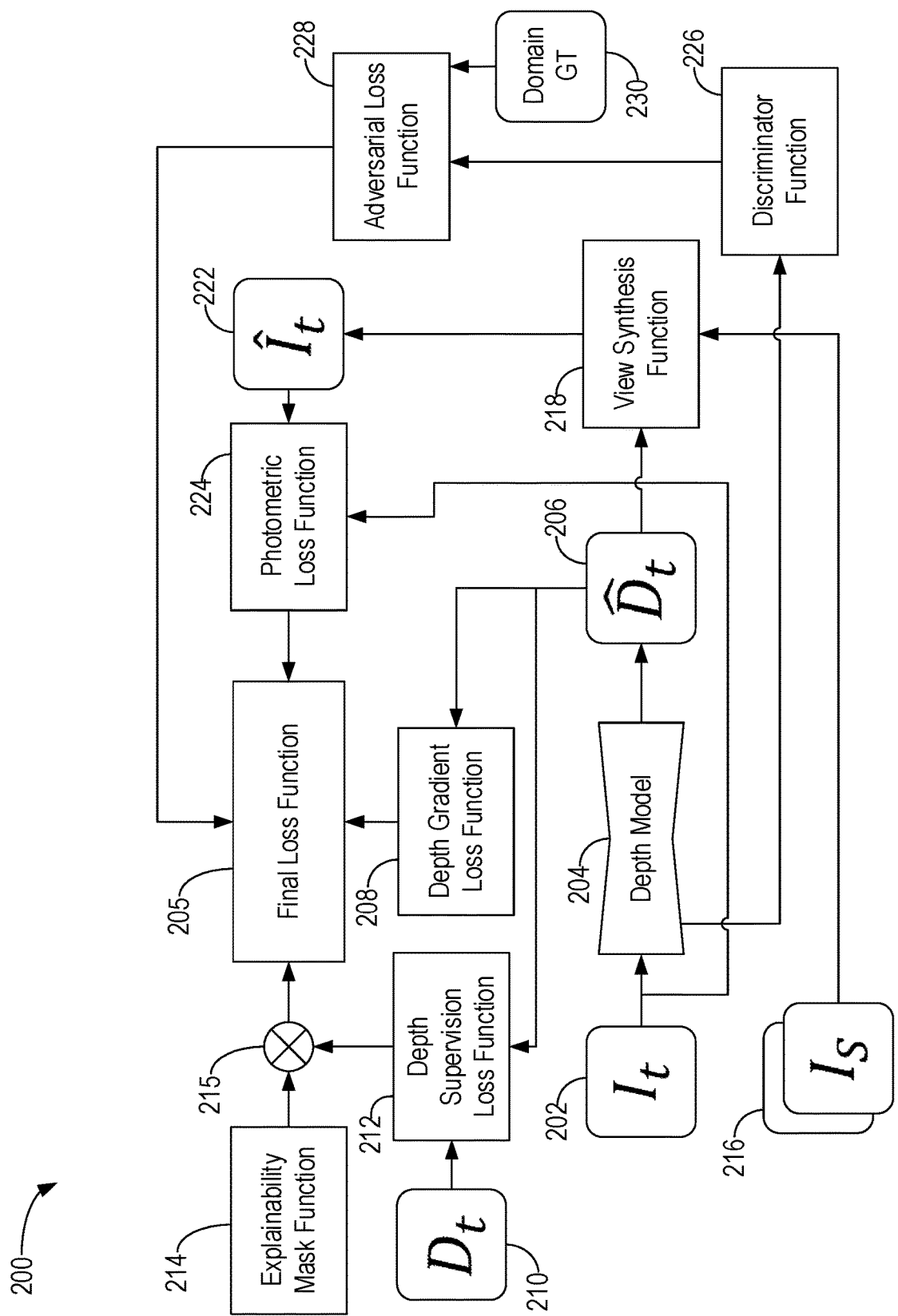
FIG. 2 depicts an example architecture for training depth models based on real and synthetic data using adversarial loss.

Example Architecture for Training Depth Models Based on Real and Synthetic Data Using Adversarial Loss FIG. 2 depicts an example architecture 200 for training depth models based on real and synthetic data using adversarial loss. In some aspects, the architecture 200 is used by a training system, such as the training system 115 of FIG. 1, to train depth models.

Initially, a subject frame 202 of image data (also referred to in some aspects as an "input image frame") at time t (It) is provided to a machine learning depth model 204, such as a monocular depth-estimating artificial neural network model (referred to in some examples as "DepthNet"). In some aspects, the depth model 204 corresponds to the depth model 120 of FIG. 1. As discussed above, the subject frame 202 may generally include real imagery (e.g., from the real training data 110 of FIG. 1) or synthetic or simulated imagery (e.g., from the synthetic training data 105 of FIG. 1). The depth model 204 processes the image data in the subject frame 202 and generates an estimated depth output (Dt) 206. Although not depicted in the illustrated example, in some aspects, the depth model 204 may also receive other information as input, such as data related to the focal length of the camera that captured the image (if the data is real) and/or the simulated focal length used to generate the image (if the data is synthetic).

The estimated depth output 206 can take different forms, such as a depth map (e.g., the depth map 135 of FIG. 1)

indicating the estimated depth of each pixel directly, or a disparity map indicating the disparity between pixels. In some aspects, depth and disparity are related and can be proportionally derived from each other.

The estimated depth output 206 is provided to a depth gradient loss function 208, which determines a loss based on, for example, the "smoothness" of the depth output. In some aspects, the smoothness of the depth output may be measured by the gradients (or average gradient) between adjacent pixels across the image. For example, an image of a simple scene having few objects may have a very smooth depth map, whereas an image of a complex scene with many objects may have a less smooth depth map, as the gradient between depths of adjacent pixels changes frequently and significantly to reflect the many objects.

The depth gradient loss function 208 provides a depth gradient loss component to a final loss function 205. Though not depicted in the figure, the depth gradient loss component may be associated with a hyperparameter (e.g., a weight) in the final loss function 205, which changes the influence of the depth gradient loss on the final loss function 205.

The estimated depth output 206 is also provided as an input to a view synthesis function 218. The view synthesis function 218 further takes as inputs one or more context frames (Is) 216. In some aspects, the view synthesis function 218 can further receive, as input, a pose estimate (e.g., from a pose estimation function or network). The view synthesis function 218 generates a reconstructed subject frame ($\hat{I}_t$) 222. For example, the view synthesis function 218 may perform an interpolation, such as bilinear interpolation, based on a pose projection from a pose estimation function and using the depth output 206.

The context frames 216 may generally comprise frames near to the subject frame 202. For example, the context frames 216 may be some number of frames or time steps on either side of the subject frame 202, such as t+/−1 (adjacent frames), t+/−2 (non-adjacent frames), or the like. Though these examples are symmetric about the subject frame 202, the context frames 216 could be non-symmetrically or asymmetrically located, such as t−1 and t+3.

In some aspects, the pose estimation function (not depicted in the illustrated example) used to generate a pose estimate to the view synthesis function 218 is generally configured to perform pose estimation, which may include determining a projection from one frame to another. The pose estimation function can use any suitable techniques or operations to generate the pose estimates, such as using a trained machine learning model (e.g., a pose network). In some aspects, the pose estimate (also referred to as a "relative pose" or "relative pose estimate" in some aspects) generally indicates the (predicted) pose of objects, relative to the imaging sensor (e.g., relative to the ego vehicle). For example, the relative pose may indicate the inferred location and orientation of objects relative to the ego vehicle (or the location and orientation of the imaging sensor relative to one or more object(s)).

In the illustrated example, the reconstructed subject frame 222 may be compared against the subject frame 202 by a photometric loss function 224 to generate a photometric loss, which is another component of the final loss function 205. As discussed above, though not depicted in the figure, the photometric loss component may be associated with a hyperparameter (e.g., a weight) in the final loss function 205, which changes the influence of the photometric loss on the final loss function 205.

In the illustrated example, the estimated depth output 206 can be additionally provided to a depth supervision loss function 212, which takes as a further input one or more ground-truth depth values 210 for the subject frame 202, in order to generate a depth supervision loss. In some aspects, the depth supervision loss function 212 is selectively used only for a subset of the input subject frames 202. For example, as discussed above, many real images (e.g., in the target domain) may lack such ground-truth information, and therefore the depth supervision loss function 212 may be unused for such images (e.g., the system may refrain from using the depth supervision loss function 212 and/or generating a depth supervision loss for some or all of the real training images).

In some aspects, the depth supervision loss function 212 may be used only if the subject frame 202 is a synthetic image (e.g., a computer-generated image for which a corresponding set of ground-truth depth values 210 is known or available). In some aspects, this use of the depth supervision loss function 212 for synthetic images may be referred to as "full supervision." In other words, the depth model 204 may provide a depth output for each pixel in the subject frame 202, and the ground-truth depth values 210 may provide estimated ground-truth values for each pixel in the subject frame 202 if the subject frame 202 is a synthetic image.

In some aspects, the depth supervision loss function 212 may additionally be used for real subject frames for which (at least some) ground-truth information is available. For example, as discussed above, the depth supervision loss function 212 may be used if depth information is known for at least a portion of the pixels in the subject frame 202 (e.g., for one or more objects detected by LIDAR or radar and depicted in the image). In some aspects, this use of the depth supervision loss function 212 for (some) real images may be referred to as a "partial supervision." In other words, while the depth model 204 provides a depth output for each pixel in the subject frame 202, the ground-truth depth values 210 may only provide estimated ground-truth values for a subset of the pixels in the subject frame 202, if the subject frame 202 is a real image.

In some aspects, the depth supervision loss generated by the depth supervision loss function 212 may be masked (using the mask operation 215) based on an explainability mask provided by an explainability mask function 214. The explainability mask may be used to limit the impact of the depth supervision loss to those pixels in the subject frame 202 that do not have explainable (e.g., estimable) depth, if the ground-truth depth values 210 do not include values for every pixel in the subject frame 202. That is, if the ground-truth depth values include values for each pixel (e.g., where the subject frame 202 is synthetic), then the explainability mask function 214 may indicate that all of the values are valid, and none should be masked from the depth supervision loss. In some aspects, the system may alternatively refrain from using the explainability mask function 214 and the mask operation 215 for synthetic subject frames.

In some aspects, if the ground-truth depth values 210 include information for a subset of the subject frame 202 (e.g., where the subject frame 202 is a real image), then the explainability mask function 214 may be used to indicate the relevant pixel(s) in the image. The explainability mask function 214 may similarly be used in some other cases, such as due to warping in the estimated subject frame 222. For example, a pixel in the subject frame 202 may be marked as "non-explainable" if the reprojection error for that pixel in the warped image (e.g., the estimated subject frame 222) is higher than the value of the loss for the same pixel with respect to the original (unwarped) context frame 216. In this example, "warping" refers to the view synthesis operation performed by the view synthesis function 218. In other words, if no associated pixel can be found with respect to the original subject frame 202 for the given pixel in the reconstructed subject frame 222, then the given pixel was probably globally non-static (or relatively non-static to the camera) in the subject frame 202 and therefore cannot be reasonably explained.

The depth supervision loss generated by the depth supervision loss function 212 and as (selectively) modified/masked by the explainability mask produced by the explainability mask function 214 is provided as another component to the final loss function 205. As above, though not depicted in FIG. 2, the depth supervision loss component (output from the mask operation 215) may be associated with a hyperparameter (e.g., a weight) in the final loss function 205, which changes the influence of the depth supervision loss on the final loss function 205.

In the illustrated example, one or more tensors from the depth model 204 are also provided as input to a discriminator function 226. For example, as discussed in more detail below, one or more intermediate tensors from one or more internal or intermediate layers of the depth model 204 may be extracted and provided as input to the discriminator function 226 (in addition to being used as input to subsequent layers in the depth model 204).

The discriminator function 226 may generally be implemented using a variety of techniques and components, and is generally used to determine or predict whether the input subject frame 202 corresponds to the source domain (e.g., the image is a synthetic image) or the target domain (e.g., the image is a real image). In some aspects, the discriminator function 226 comprises a machine learning model (e.g., a neural network or subnet). That is, the discriminator function 226 may comprise one or more parameters (e.g., weights) with values that can be learned using the architecture 200 to accurately predict whether the input subject frame 202 is real or synthetic.

In some aspects, the discriminator function 226 additionally or alternatively comprises or uses other domain disparity operations to evaluate the discriminator function's input, such as a maximum mean discrepancy (MMD) operation, a correlation alignment (CORAL) operation, a contrastive domain discrepancy (CDD) operation, or a Kullback-Leibler (KL) divergence operation.

In some such aspects, the domain disparity operations may generally be used to measure or evaluate the distribution disparity between the source and target domains, allowing the discriminator function 226 to predict whether the subject frame 202 is synthetic or real. For example, an MMD operation may correspond to a hypothesis test, which tests whether two samples are from the same distribution. To use such an operation, the discriminator function 226 may compare the means of the input features after mapping the features to a functional space (e.g., a reproducing kernel Hilbert space (RKHS)). If the means are different, then the discriminator function 226 may determine that the distributions are likely different as well. For example, if the discriminator function 226 determines that the mean of its input features differ from a known set (e.g., from a known synthetic input or a known real input), then the discriminator function 226 may infer that the subject frame 202 is real or synthetic, respectively.

As another example, the discriminator function 226 may use a CORAL operation to evaluate the input, which is similar to the MMD approach discussed above, but which seeks to align the second-order statistics (e.g., correlations) of the source and target distributions, rather than the means. As yet another example, the discriminator function 226 may use a CDD operation which is also similar to the MMD approach, but which also makes use of label distributions by looking at conditional distributions to ensure that the joint domain features still retain predictive power with respect to the labels (e.g., labels indicating whether the input is real or synthetic). In some aspects, minimizing the CCD may minimize the intra-class discrepancy while maximizing the inter-class discrepancy.

As yet another example, the discriminator function 226 may use a KL divergence operation, which is a type of statistical distance that can be used to measure how one probability distribution (e.g., the distribution of the input data to the discriminator function 226) differs from a second reference probability distribution (e.g., a known distribution for real or synthetic images).

In some aspects, as discussed below in more detail with reference to FIG. 3, the discriminator function 226 may use a combination of techniques to evaluate its input. For example, the discriminator function 226 may use simpler or less computationally expensive techniques (such as MMD, CDD, CORAL, and the like) for some inputs, and more complex or computationally expensive techniques (such as a neural network or a GAN) for other inputs.

In the illustrated example, the output of the discriminator function 226 (e.g., a prediction indicating whether the subject frame 202 is real or synthetic) is provided as input to an adversarial loss function 228, which also receives a domain ground truth 230. In some aspects, the domain ground truth 230 indicates whether the subject frame is, in fact, real or synthetic (e.g., whether the subject frame corresponds to or is from the target domain or the source domain). The adversarial loss function 228 can generally use the domain prediction (generated by the discriminator function 226) and the domain ground truth 230 to generate an adversarial loss. The adversarial loss can then be provided as another component to the final loss function 205. As above, though not depicted in the figure, the adversarial supervision loss component (output from the adversarial loss function 228) may be associated with a hyperparameter (e.g., a weight) in the final loss function 205, which changes the influence of the adversarial loss on the final loss function 205.

Accordingly, the discriminator function 226 and the adversarial loss function 228 provide an additional supervisory signal that allows improved training of monocular depth estimation models (e.g., the depth model 204) using a combination of real and synthetic subject frames while accounting or controlling for domain differences between such real and synthetic images.

Although not depicted in the illustrated example, in some aspects, the final loss function 205 may receive other inputs, such as one or more regularization terms. In some aspects, the final or total (multi-component) loss generated by the final loss function 205 is used to update or refine one or more components of the architecture 200, such as the depth model 204 and/or the discriminator function 226 (if the discriminator function 226 is parameterized or includes learnable parameters). For example, using gradient descent and/or backpropagation, one or more parameters of the depth model 204 and the discriminator function 226 may be refined or updated based on the total loss generated for a given subject frame 202.

In some aspects, this updating may be performed independently and/or sequentially for a set of subject frames (e.g., using stochastic gradient descent to sequentially update the parameters of the depth model 204 and/or discriminator function 226 based on each subject frame 202) and/or based on batches of subject frames (e.g., using batch gradient descent).

Using the training architecture 200, the depth model 204 thereby learns to generate improved and more-accurate depth estimations (e.g., the depth output 206). During runtime inferencing, the trained depth model 204 may be used to generate the depth output 206 for an input subject frame 202. This depth output 206 can then be used for a variety of purposes, such as autonomous driving and/or driving assistance, as discussed above. In some aspects, at runtime, the depth model 204 may be used without consideration or use of other aspects of the training architecture 200, such as the context frame(s) 216, view synthesis function 218, pose estimation functions, reconstructed subject frames 222, photometric loss function 224, depth gradient loss function 208, depth supervision loss function 212, explainability mask function 214, discriminator function 226, adversarial loss function 228, and final loss function 205.

In some aspects, during runtime, a monocular depth model (e.g., the depth model 204) may be continuously or repeatedly used to process input frames. Intermittently, the training architecture 200 may be activated to refine or update the depth model 204. In some aspects, this intermittent use of the training architecture 200 to update the depth model 204 may be triggered by various events or dynamic conditions, such as in accordance with a predetermined schedule, and/or in response to performance deterioration, presence of an unusual environment or scene, availability of computing resources, and the like.

Figure 3:
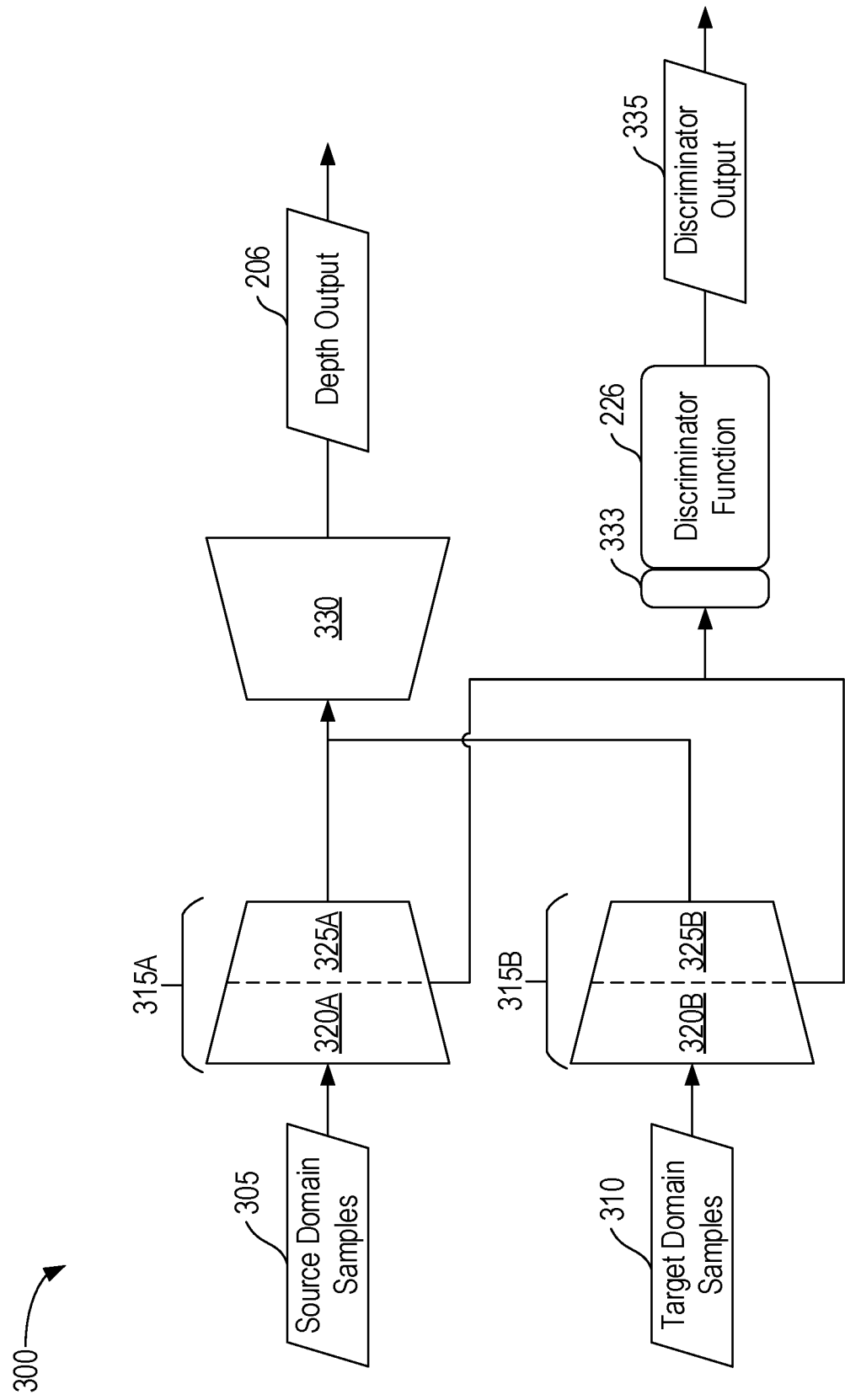
FIG. 3 depicts an example architecture for training depth models and discriminator functions based on real and synthetic data.

Example Training Depth Models and Discriminator Functions Based on Real and Synthetic Data FIG. 3 depicts an example architecture 300 for training depth models and discriminator functions based on real and synthetic data. In some aspects, the architecture 300 is used by a training system, such as the training system 115 of FIG. 1, to train depth models. In some aspects, the architecture 300 provides additional detail for the depth model 204 and the discriminator function 226 of FIG. 2.

In the illustrated example, source domain samples 305 and target domain samples 310 are provided as input to a set of encoders 315A and 315B (collectively, encoders 315). The source domain samples 305 and the target domain samples 310 may generally correspond to subject frames, such as the subject frame 202 of FIG. 2, used as input during training of a depth model, such as the depth model 204 of FIG. 2 and/or the depth model 120 of FIG. 1. In some aspects, the source domain samples 305 correspond to synthetic images, such as the synthetic training data 105 of FIG. 1, while the target domain samples 310 correspond to real images, such as the real training data 110 of FIG. 1.

In the illustrated example, the encoder 315A and/or the encoder 315B, along with a decoder 330, collectively form the depth model (e.g., the depth model 204 of FIG. 2 and/or the depth model 120 of FIG. 1). Generally, the encoders 315 and the decoder 330 may each be implemented using a variety of architectures. In some aspects, the encoders 315 and the decoder 330 are constructed using neural networks or subnets.

In the depicted example, two encoders 315 are depicted: an encoder 315A used to process the source domain samples 305 and an encoder 315B used to process the target domain samples 310. In some aspects, rather than separate encoders 315, the architecture 300 may use a single encoder to process both source domain samples 305 and target domain samples 310. Additionally, in the illustrated example, the encoders 315A and 315B may have matching or shared parameters (e.g., shared weights), or may have differing parameters. That is, the parameters of each encoder 315A and 315B (e.g., weights and/or biases) may be learned jointly (e.g., a shared set of parameters used by both) or separately.

The encoders 315 are generally configured to generate output features based on input images (e.g., based on the source domain samples 305 and the target domain samples 310). As illustrated, the output features (generated by each encoder 315) are provided as input to the decoder 330, which processes the output features to generate a corresponding depth output 206 (e.g., a depth map) for the input image. As discussed above and below in more detail, during training, the depth output 206 may be used to generate a variety of losses, such as a photometric loss, a depth gradient loss, and/or a depth supervision loss.

Although the illustrated example suggests that output features from both the encoder 315A and the encoder 315B are simultaneously provided as input to the decoder 330, it should be understood that, when training the architecture, the system will apply either a source domain sample 305 or a target domain sample 310 at any given point, allowing the corresponding output features to be used as input to the decoder 330.

In the illustrated architecture 300, the discriminator function 226 receives, as input, one or more intermediate features (also referred to in some aspects as "intermediate tensors") from the encoders 315. Specifically, in the illustrated example, the intermediate features are passed through a gradient reversal layer 333 which acts as a pass-through during inferencing, but which allows effective training of the depicted components during backpropagation.

In the illustrated example, each encoder 315 is delineated into two portions: a first portion 320A and 320B (collectively, portions 320) that includes one or more layers in each encoder 315 prior to the attachment point (e.g., prior to the point where the intermediate tensors are output to the discriminator function 226) and a second portion 325A and 325B (collectively, portions 325) that includes one or more layers in each encoder 315 subsequent to the attachment point (e.g., subsequent to the point where the intermediate tensors are output to the discriminator function 226).

For example, suppose the portions 320 each include a set of one or more layers culminating in a first internal layer, and the portions 325 each include a set of one or more layers beginning with a second internal layer. The first internal layer generates an intermediate feature which is used as input to the second internal layer. In the illustrated example, this intermediate feature (generated by the first internal layer) is also used as input to the discriminator function 226. Generally, the attachment point on the encoder 315A matches the attachment point on the encoder 315B. That is, even if the encoders 315A and 315B use differing weights or other parameters, the encoders may otherwise have the same architecture (e.g., the same number and arrangement of layers), and the intermediate features may be extracted from corresponding layers in each (e.g., from the third layer of each encoder 315).

Although the illustrated example suggests that intermediate features from both the encoder 315A (e.g., from the portion 320A) and the encoder 315B (e.g., from the portion 320B) are simultaneously provided as input to the discriminator function 226, it should be understood that, when training the architecture, the system will apply either a source domain sample 305 or a target domain sample 310 at any given point, allowing the corresponding intermediate features to be used as input to the discriminator function 226.

Although evaluation, by the discriminator function 226, of a single intermediate feature is depicted for conceptual clarity (e.g., output by either the encoder 315A or the encoder 315B depending on whether a source domain sample 305 or a target domain sample 310 is used as input), in some aspects, multiple intermediate tensors may be used from multiple attachment points in each encoder 315. For example, suppose the encoders 315 include ten layers. In some aspects, the discriminator function 226 may receive, as input, intermediate features from the second layers, fifth layers, seventh layers, and so on.

As discussed above, the discriminator function 226 generally evaluates the input feature(s) to generate a discriminator output 335 comprising a prediction as to whether the input sample (provided to the encoder 315A or 315B) was from a source domain sample 305 or a target domain sample 310. In some aspects, as discussed above, the discriminator function 226 may use a variety of operations, such as neural networks or other deep learning architectures, distribution discrepancy evaluation operations, and the like in order to classify or predict whether the input sample was from the source or target domain.

In some aspects, if multiple intermediate features are received (e.g., from multiple points in the encoders 315), then the discriminator function 226 may use multiple different techniques or operations to evaluate the intermediate features. For example, intermediate features from a first internal layer of the encoders 315 may be evaluated using a first operation (e.g., a machine learning model such as a neural network or a GAN), while intermediate features from a second internal layer of the encoders 315 may be evaluated using a second operation (e.g., MMD, CDD, and the like).

In some aspects, different parametric and/or non-parametric operations may be used for each intermediate feature based at least in part on how deep the corresponding attachment point is in the encoders 315. For example, simpler or less computationally expensive approaches may be used for features from shallow layers (nearer to the beginning of the encoders 315) to efficiently predict the domain of the input sample with reduced expense (e.g., because such early features are likely to differ substantially between the domains, and therefore expensive or complex prediction operations are less useful), while more complex or expensive approaches may be used for features from deeper layers (nearer to the end of the encoders 315) to accurately predict the domain of the input sample with higher accuracy (e.g., because such later features are likely to be highly similar between the domains, and therefore expensive or complex prediction operations may be useful).

As discussed above, the discriminator output 335 may be used to generate adversarial loss for the system (e.g., based on a ground-truth value indicating whether the input sample was from the source domain or target domain, as discussed above). In this way, the architecture 300 can be used to generate a variety of loss components during training. For example, as discussed above, the depth output 206 may be used to generate a photometric loss and/or a depth gradient loss. If the input sample was a source domain sample 305 or there is otherwise at least partial ground-truth depth information available for the input sample, then the depth output 206 may further be used to generate a depth supervision loss. Further, the discriminator output 335 may be used to generate an adversarial loss.

The specific formulations or operations used to generate each loss component may vary depending on the particular implementation. For example, in some aspects, the photometric loss may be generated based on the difference between the original input image and the recreated/warped image, and the depth gradient loss may be generated based on the smoothness of the generated depth output 203, as discussed above. If ground truth is available (e.g., the input image was synthetic), then the depth supervision loss may be generated based on the difference between the depth output 206 and the ground-truth depth information, such as using mean squared error (MSE), L1 or L2 loss, multi-scale structural similarity index measure (MSSIM) loss, and the like. The adversarial loss may be generated based on the predicted domain reflected in the discriminator output 335 and the ground-truth domain of the input sample, such as using binary cross entropy.

In some aspects, the encoders 315, decoder 330, and discriminator function 226 may be updated or refined (e.g., the parameters of each, such as weights and/or biases) based on various losses during the training phase. Further, in some aspects, the parameters of each layer of the encoders 315 may be updated based on differing loss formulations based at least in part on whether the layer occurs before or after the attachment point from which the intermediate feature(s) are extracted and provided to the discriminator function 226.

For example, in some aspects, the parameters of the portions 320 of encoders 315 (prior to the attachment point from which intermediate features are drawn) may be updated based on the photometric loss, the depth supervision loss (if available), and/or the adversarial loss. In some aspects, the parameters of the portions 325 of encoders 315 (subsequent to the attachment point from which intermediate features are drawn) may be updated based on the photometric loss and the depth supervision loss (if available) without use of the adversarial loss. In some aspects, the parameters of the decoder 330 may similarly be updated based on the photometric loss and the depth supervision loss (if available) without use of the adversarial loss. In some aspects, the parameters of the discriminator function 226 (if the discriminator function 226 is parameterized) may be updated based on the adversarial loss, without use of the photometric loss and/or the depth supervision loss.

In some aspects, the portions 320 of the encoders 315 may be updated according to Expression 1 below, where $\theta_b$ is the parameters of the portions 320, $\mu$ is a hyperparameter (e.g., a learning rate), LP is the photometric loss, LS is the depth supervision loss, $\lambda$ represents the gradient reversal layer 333 discussed above (which acts as a pass through layer during inference), and LA is the adversarial loss.

$$\theta_b \leftarrow \theta_b - \mu\left(\frac{\partial LP}{\partial \theta_b} + \frac{\partial LS}{\partial \theta_b} - \lambda\frac{\partial LA}{\partial \theta_b}\right) \quad (1)$$

In some aspects, the portions 325 of the encoders 315 may be updated according to Expression 2 below, where $\theta_a$ is parameters of the portions 325, and the remaining elements are defined as discussed above with reference to Expression 1.

$$\theta_a \leftarrow \theta_a - \mu\left(\frac{\partial LP}{\partial \theta_a} + \frac{\partial LS}{\partial \theta_a}\right) \quad (2)$$

In some aspects, the decoder 330 may be updated according to Expression 3 below, where $\theta_{de}$ is parameters of the decoder 330, and the remaining elements are defined as discussed above with reference to Expression 1.

$$\theta_{de} \leftarrow \theta_{de} - \mu\left(\frac{\partial LP}{\partial \theta_{de}} + \frac{\partial LS}{\partial \theta_{de}}\right) \quad (3)$$

In some aspects, the discriminator function 226 may be updated according to Expression 4 below, where $\theta_a$ is parameters of the discriminator function 226, and the remaining elements are defined as discussed above with reference to Expression 1.

$$\theta_{di} \leftarrow \theta_{di} - \mu\frac{\partial LA}{\partial \theta_{di}} \quad (4)$$

Although not included in Expressions 1-4, other loss components (such as a smoothness loss generated by depth gradient loss function 208 of FIG. 2) may be integrated in a similar fashion to the photometric loss above (e.g., added as another loss term in Expressions 1, 2, and/or 3). In some aspects, the encoders 315, decoder 330, and discriminator function 226 may be trained using stochastic gradient descent (e.g., using each image sample individually) and/or using back gradient descent. Training may similarly include any number of epochs or iterations. In some aspects, input samples may be selected in any order using any suitable criteria or technique from the source domain samples 305 and the target domain samples 310, including randomly or pseudo-randomly.

In some aspects, rather than randomly selecting the source or target domain, the system may first train the encoder(s) 315 and the decoder 330 using the source domain samples 305 prior to using any target domain samples 310 and/or training the discriminator function 226. In some aspects, such pre-training of the encoder 315 and the decoder 330 using only synthetic data can improve training stability and convergence when the real data from target domain samples 310 are used to further update the encoders 315, decoder 330, and/or discriminator function 226.

In some aspects, once training is complete, the encoders 315 (or the encoder 315B trained for the target domain, if the encoders 315A and 315B do not share parameters) and the decoder 330 may be used to generate a depth output for real input images, and the gradient reversal layer 333, discriminator function 226, and/or encoder 315A (if the encoders 315A and 315B do not share parameters) may be discarded or unused. For example, at runtime or during inferencing, a real image may be provided as input to the encoder 315B to generate output features, which are processed by the decoder 330 to generate an output depth map.

Figure 4:
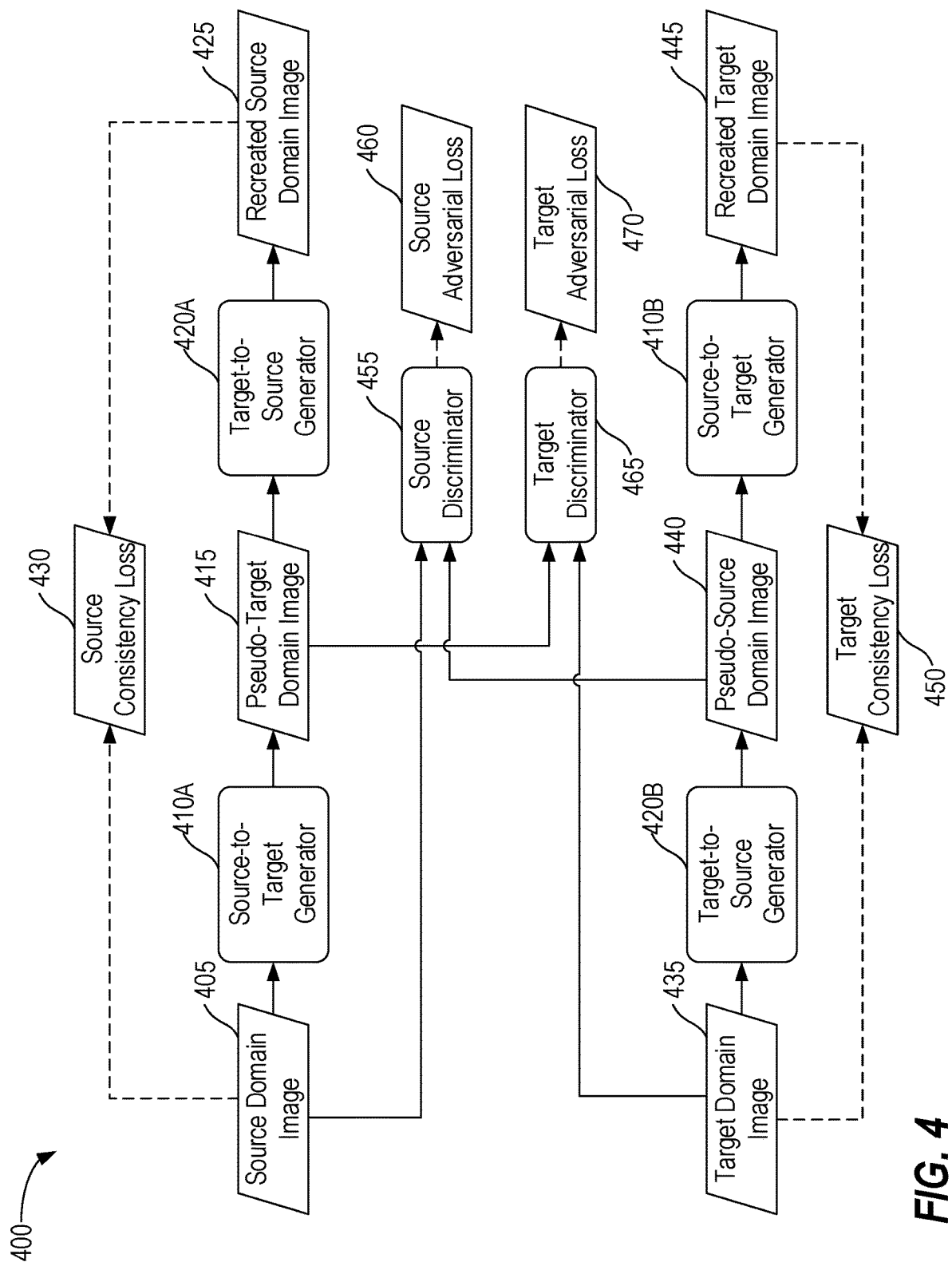
FIG. 4 depicts an example architecture for training cycle generative adversarial networks to enable depth model training based on synthetic data.

Example Architecture for Training Cycle Generative Adversarial Networks to Enable Depth Model Training Based on Synthetic Data FIG. 4 depicts an example architecture 400 for training cycle generative adversarial networks (GANs) to enable depth model training based on synthetic data. In some aspects, the architecture 400 is used by a training system, such as the training system 115 of FIG. 1, to train depth models. The illustrated architecture 400 specifically depicts training of a cycle GAN model to convert real images to synthetic images (and vice versa), improving the training and/or runtime use of the depth model, as discussed below.

In the illustrated example, source domain images 405 (e.g., a synthetic image from the source domain) are provided as input to a source-to-target generator 410A to generate a corresponding pseudo-target domain image 415. Generally, the source-to-target generator 410A (or 410B described below) is a machine learning model (or component thereof), such as a neural network, that learns to generate corresponding pseudo-target domain images (or recreated target domain images) based on input source domain images (or pseudo-source domain images). That is, for a given synthetic image, the source-to-target generator attempts to generate a corresponding "real" image (e.g., an image that appears to be real, as opposed to synthetic) depicting the same content.

As illustrated, the pseudo-target domain images 415 are provided as input to a target-to-source generator 420A to generate a corresponding recreated source domain image 425. Generally, the target-to-source generator 420A (or 420B described below) is a machine learning model (or component thereof), such as a neural network, that learns to generate corresponding recreated source domain images (or pseudo-source domain images) based on input pseudo-target domain images (or target domain images). That is, for a given real image, the target-to-source generator attempts to generate a corresponding "synthetic" image (e.g., an image that appears to be synthetic, as opposed to real) depicting the same content. In this way, the target-to-source generator seeks to perform the opposite task of the source-to-target generator. Although depicted as discrete models for conceptual clarity, in some aspects, the source-to-target generator and target-to-source generator may be implemented using a single model (e.g., by reversing the layers of one to form the other).

In the illustrated example, the source domain image 405 and the recreated source domain image 425 are then compared and used to generate a source consistency loss 430 (e.g., using any of various suitable techniques, such as cross entropy, mean squared error, and the like). Generally, the source consistency loss 430 may be generated on a per-pixel basis, on a per-feature or per-region basis, and the like. The source consistency loss 430 is generally used to update the parameters of the source-to-target generator 410A and the target-to-source generator 420A to ensure that the models are learning to generate non-random output that actually reflects the content of the inputs.

In the illustrated architecture 400, target domain images 435 (e.g., a real image from the target domain) are also provided as input to the target-to-source generator 420B to generate a corresponding pseudo-source domain image 440. As illustrated, the pseudo-source domain images 440 are provided as input to the source-to-target generator 410B to generate a corresponding recreated target domain image 445.

In the illustrated example, the target domain image 435 and the recreated target domain image 445 are then compared and used to generate a target consistency loss 450 (e.g., using any of various suitable techniques, such as cross entropy, mean squared error, and the like). Generally, in a similar fashion to the source consistency loss 430, the target consistency loss 450 may be generated on a per-pixel basis, on a per-feature or per-region basis, and the like. The target consistency loss 450 is similarly used to update the parameters of the source-to-target generator 410B and the target-to-source generator 420B to ensure that the models are learning to generate non-random output that actually reflects the content of the inputs.

In the illustrated example, the source domain images 405 and the pseudo-source domain images 440 are provided separately to a source discriminator 455, which attempts to differentiate or classify its input as either a "true" source domain image (e.g., a synthetic image) or a "false" source domain image (e.g., a synthetic image generated by the target-to-source generator 420B based on a real image). The resulting output/classification can be compared against the ground truth (e.g., whether the input was true or false) to generate source adversarial loss 460.

Similarly, the target domain images 435 and pseudo-target domain images 415 are provided separately to a target discriminator 465, which attempts to differentiate or classify its input as either a "true" target domain image (e.g., a real image) or a "false" target domain image (e.g., a fake image generated by the source-to-target generator 410A based on a synthetic image). The resulting output/classification can be compared against the ground truth (e.g., whether the input was true or false) to generate target adversarial loss 470. In the illustrated example, the source adversarial loss 460 and the target adversarial loss 470 can be used to refine the discriminators and/or generators.

In some aspects, a depth model (e.g., the depth model 120 of FIG. 1) may be trained before, during, or after training of the cycle GAN. In some aspects, the depth model is trained based entirely or primarily on synthetic images with full ground truth (e.g., without using real images), which enables full supervision during training of the depth model. In some aspects, once fully trained, the depth model can be deployed, alongside the (trained) target-to-source generator 420B. During runtime, the source-to-target generator 410A, source discriminator 455, and target discriminator 465 may be discarded or unused.

During runtime, to generate an inference (e.g., a depth output or depth map), a real image (captured in the physical environment) can be first processed by the target-to-source generator 420B to generate a pseudo-source image (e.g., an equivalent or approximate fake synthetic image). This pseudo-source image can then be processed using the trained depth model (which was trained primarily or entirely on synthetic data) to generate an output depth map.

Figure 5:
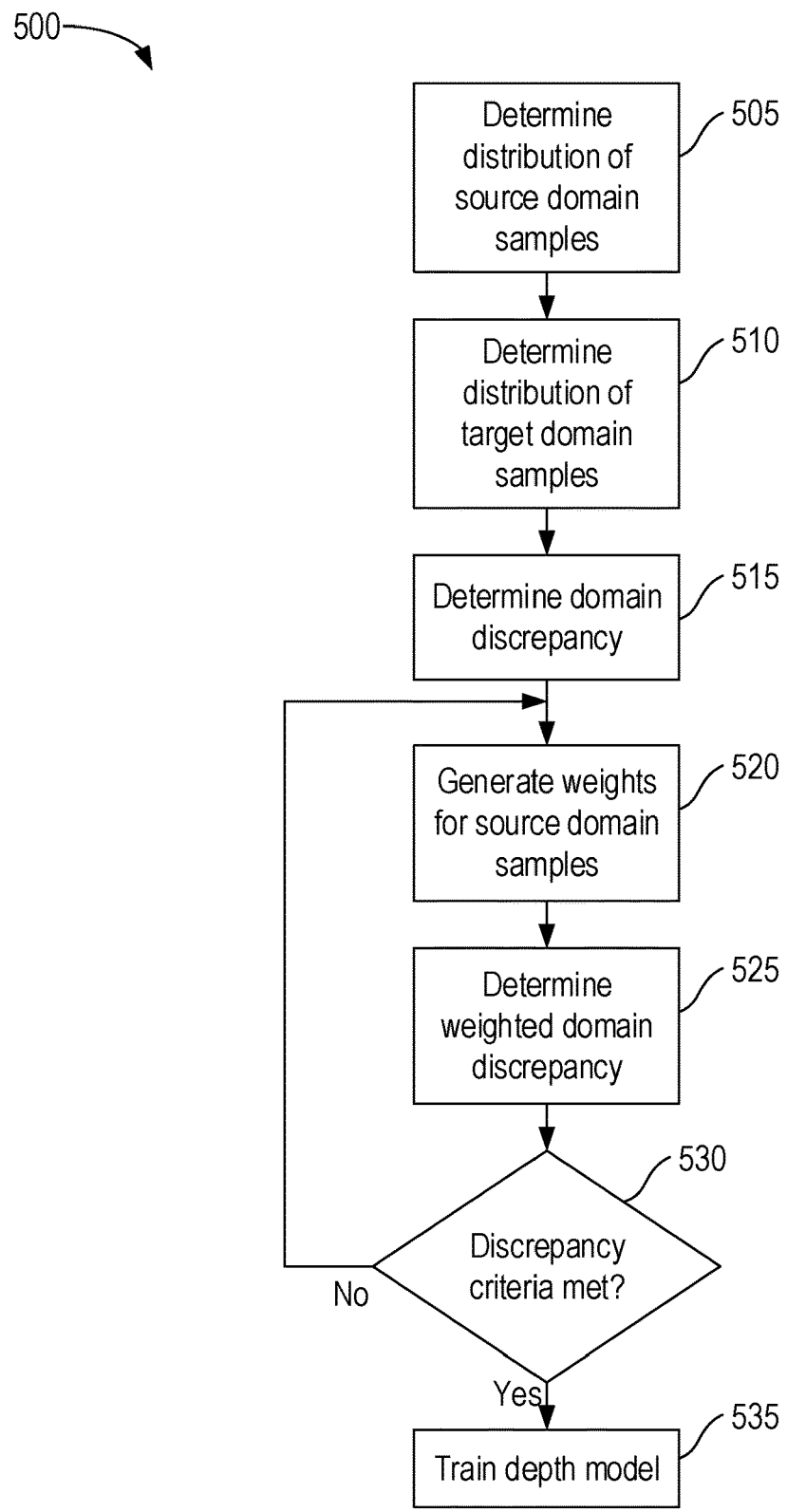
FIG. 5 is a flow diagram depicting an example method for training depth models based on real and synthetic data using sample weighting.

Example Method for Training Depth Models Based on Real and Synthetic Data Using Sample Weighting FIG. 5 is a flow diagram depicting an example method 500 for training depth models based on real and synthetic data using sample weighting. In some aspects, the method 500 is performed by a training system, such as the training system 115 of FIG. 1, to train depth models.

In the illustrated example, the method 500 can be used to weight each image sample in one or both domains differently to account for differences between the source and target domains. For example, the training system may generate a weight for each synthetic sample such that the discrepancy between the (weighted) synthetic data distribution and the actual real-world data distribution is minimized, or at least reduced. By formulating the problem as an optimization problem (where the objective is to minimize the disparity between the weighted source (e.g., synthetic) and target (e.g., real-world) distributions), the training system can achieve a domain invariant feature representation of input data, which improves depth model training. In some aspects, the training system may use the method 500 independently (e.g., without using the other techniques described herein), and/or may combine the method 500 with one or more other methods and techniques described herein to train depth models. For example, the method 500 may be used to re-weight training samples prior to using such samples to train the depth model (e.g., using architecture 300 of FIG. 3).

At block 505, the training system determines a distribution of the source domain samples (e.g., the synthetic training data 105 of FIG. 1). Generally, determining the distribution of the source domain samples may include use of a variety of techniques and operations to evaluate the input portion of the source domain samples (e.g., the synthetic images themselves) as opposed to the target output or labels (e.g., the ground-truth depth maps). In some aspects, determining the distribution of the source samples comprises determining the distribution(s) of various characteristics of the images themselves, such as the distributions of colors and brightness. In some aspects, determining the distributions of the source samples includes determining the distribution of more subtle information, such as the depicted weather conditions, locales (e.g., country or city, which may affect how some objects such as signage appear), and the like.

At block 510, the training system similarly determines a distribution of the target domain samples (e.g., the real training data 110 of FIG. 1). Generally, determining the distribution of the target domain samples may include use of a variety of techniques and operations to evaluate the input portion of the target domain samples (e.g., the actual images themselves), as discussed above. In some aspects, determining the distribution of the target samples comprises determining the distribution(s) of various characteristics of the images themselves, such as the distributions of colors and brightness. In some aspects, determining the distributions of the target samples includes determining the distribution of more subtle information, such as the depicted weather conditions, locales (e.g., country or city, which may affect how some objects such as signage appear), and the like.

At block 515, the training system determines the domain discrepancy between the source domain distribution(s) and the target domain distribution(s). For example, as discussed above, the training system may use various techniques such as MMD, CORAL, CDD. KL divergence, and the like to quantify or evaluate the disparity between the domain distributions. Although the illustrated example on the depth loss.

In some aspects, determining the depth loss is performed in response to determining that the input image frame is from the source domain.

In some aspects, the method 900 further includes, in response to determining that the first ground truth indicates that the input image frame is from the target domain, refraining from determining a depth loss based on the depth output.

In some aspects, the depth model comprises one or more encoder subnets and a decoder subnet. In such aspects, the one or more intermediate features may include a first intermediate feature generated by a first internal layer of the one or more encoder subnets.

In some aspects, the one or more encoder subnets comprise either: (i) a single encoder subnet that processes input from both the source domain and the target domain, or (ii) a first encoder that processes input from the source domain and a second encoder that processes input from the target domain.

In some aspects, the one or more encoder subnets comprise a first encoder that processes input from the source domain and a second encoder that processes input from the target domain. The first and second encoders may have matching parameters.

In some aspects, the one or more encoder subnets comprise a first subset of layers prior to the first internal layer and a second subset of layers subsequent to the first internal layer. In such aspects, refining one or more machine learning models of the set of machine learning models based on the adversarial loss may include updating the first subset of layers based on the adversarial loss. The second subset of layers may not be updated based on the adversarial loss.

In some aspects, the method 900 further includes updating the depth model based on a first plurality of input image frames from the source domain. Subsequent to updating the depth model based on the first plurality of input image frames, the method 900 may further include updating at least one of the depth model or the discriminator component based on a second plurality of input image frames from the target domain.

In some aspects, the one or more intermediate features are passed through a gradient reversal layer prior to being input to the discriminator component.

In some aspects, the discriminator component comprises a machine learning model trained to predict whether the input image frame is from the source domain or the target domain.

In some aspects, the discriminator component predicts whether the input image frame is from the source domain or the target domain using one or more domain disparity operations. The one or more domain disparity operations may include at least one of: a maximum mean discrepancy (MMD) operation, a correlation alignment (CORAL) operation, a contrastive domain discrepancy (CDD) operation, or a Kullback-Leibler (KL) divergence operation.

In some aspects, training the set of machine learning models comprises: (i) training a generator model, based on the data from the source domain and the data from the target domain, to generate pseudo-synthetic data when the data from the target domain is used as input to the generator model, and (ii) training a depth model to generate depth outputs, wherein the depth model is trained based on the data from the source domain and is not trained on the data from the target domain.

In some aspects, the method 900 further includes, prior to training the set of machine learning models: generating a set of weights for the data from the source domain based at least in part on a first disparity between a distribution of the data from the source domain and a distribution of the data from the target domain, wherein: the set of weights results in a second disparity between a weighted distribution of the data from the source domain and the distribution of the data from the target domain, the second disparity is lower than the first disparity, and the data from the source domain is weighted based on the set of weights when training the set of machine learning models.

Example Processing System for Machine Learning

Figure 10:
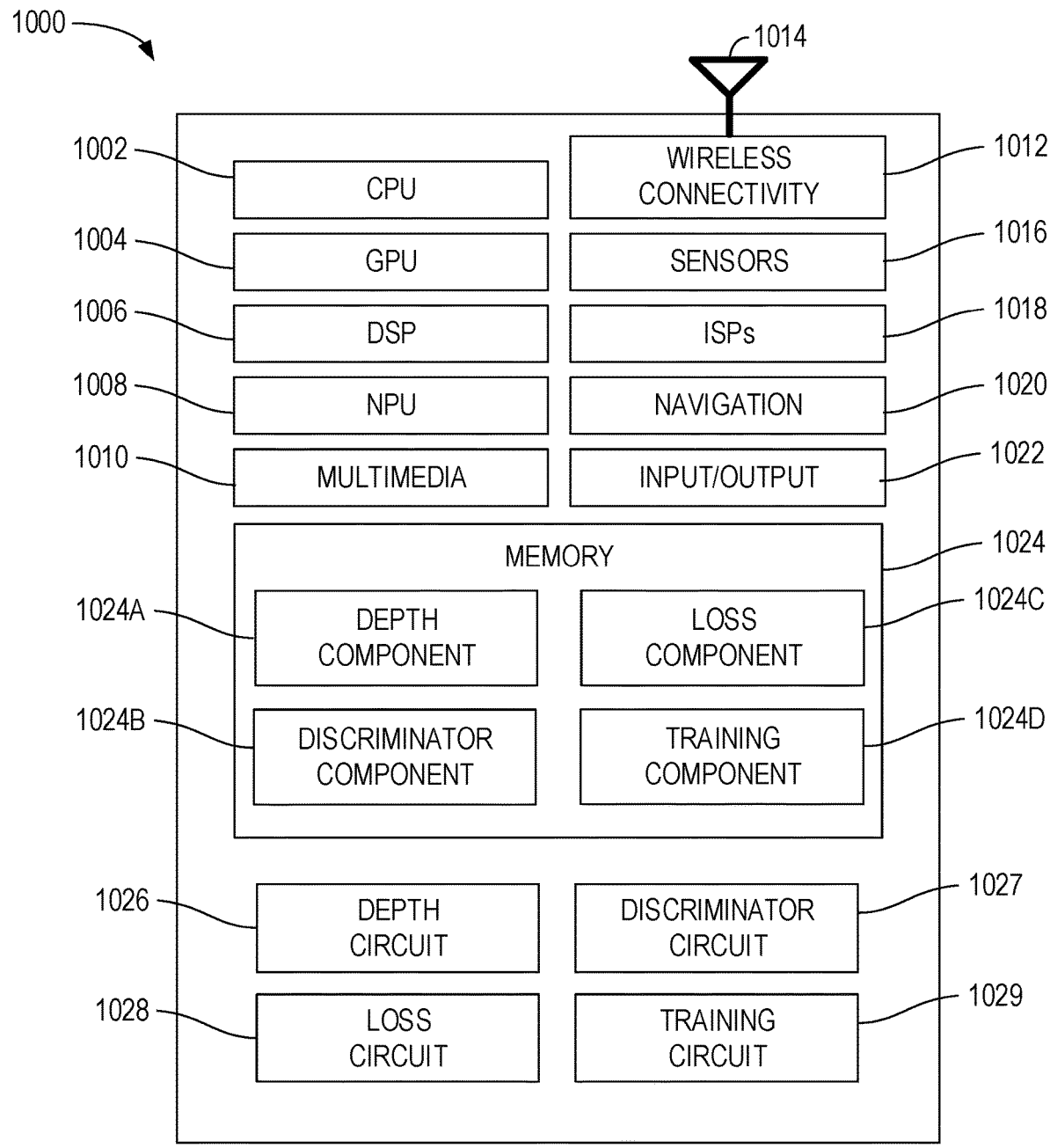
FIG. 10 depicts an example processing system configured to perform various aspects of the present disclosure.

In some aspects, the workflows, techniques, and methods described with reference to FIGS. 1-9 may be implemented on one or more devices or systems. FIG. 10 depicts an example processing system 1000 configured to perform various aspects of the present disclosure, including, for example, the techniques and methods described with respect to FIGS. 1-9. In some aspects, the processing system 1000 may correspond to a training system, such as the training system 115 of FIG. 1. For example, the processing system 1000 may correspond to a device that trains depth models. Although depicted as a single system for conceptual clarity, in some aspects, as discussed above, the operations described below with respect to the processing system 1000 may be distributed across any number of devices or systems.

The processing system 1000 includes a central processing unit (CPU) 1002, which in some examples may be a multi-core CPU. Instructions executed at the CPU 1002 may be loaded, for example, from a program memory associated with the CPU 1002 or may be loaded from a memory partition (e.g., a partition of memory 1024).

The processing system 1000 also includes additional processing components tailored to specific functions, such as a graphics processing unit (GPU) 1004, a digital signal processor (DSP) 1006, a neural processing unit (NPU) 1008, a multimedia component 1010 (e.g., a multimedia processing unit), and a wireless connectivity component 1012.

An NPU, such as NPU 1008, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 1008, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 1008 is a part of one or more of the CPU 1002, the GPU 1004, and/or the DSP 1006.

In some examples, the wireless connectivity component 1012 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and/or other wireless data transmission standards. The wireless connectivity component 1012 is further coupled to one or more antennas 1014.

The processing system 1000 may also include one or more sensor processing units 1016 associated with any manner of sensor, one or more image signal processors (ISPs) 1018 associated with any manner of image sensor, and/or a navigation processor 1020, which may include satellite-based positioning system components (e.g., GPS or GLONASS), as well as inertial positioning system components.

The processing system 1000 may also include one or more input and/or output devices 1022, such as screens, touch-sensitive surfaces (including touch-sensitive displays), physical buttons, speakers, microphones, and the like.

In some examples, one or more of the processors of the processing system 1000 may be based on an ARM or RISC-V instruction set.

The processing system 1000 also includes the memory 1024, which is representative of one or more static and/or dynamic memories, such as a dynamic random access memory, a flash-based static memory, and the like. In this example, the memory 1024 includes computer-executable components, which may be executed by one or more of the aforementioned processors of the processing system 1000.

In particular, in this example, the memory 1024 includes a depth component 1024A, a discriminator component 1024B, a loss component 1024C, and a training component 1024D. Although not depicted in the illustrated example, the memory 1024 may also include other data such as model parameters for one or more models (e.g., depth models, discriminator models, GAN models, and the like), training data (e.g., real and/or synthetic images and ground-truth information for one or more of the images), and the like. Though depicted as discrete components for conceptual clarity in FIG. 10, the illustrated components (and others not depicted) may be collectively or individually implemented in various aspects.

The processing system 1000 further comprises a depth circuit 1026, a discriminator circuit 1027, a loss circuit 1028, and a training circuit 1029. The depicted circuits, and others not depicted, may be configured to perform various aspects of the techniques described herein.

For example, the depth component 1024A and/or the depth circuit 1026 (which may correspond to a depth machine learning model such as the depth model 120 of FIG. 1, the depth model 204 of FIG. 2, the encoders 315 and the decoder 330 of FIG. 3, the depth model trained for use with the architecture 400 of FIG. 4, and the like) may comprise or use one or more machine learning models to generate predicted depth maps based on input images, as discussed above.

The discriminator component 1024B and and/or discriminator circuit 1027 (which may correspond to one or more discriminator models, such as the discriminator function 226 of FIGS. 2-3, the source discriminator 455 and/or the target discriminator 465, each of FIG. 4, and the like) may comprise or use one or more machine learning models (or other techniques, such as non-parameterized evaluations) to predict whether input features or data correspond to, come from, and/or were generated based on data from a source domain (e.g., synthetic data) or a target domain (e.g., real data), as discussed above.

The loss component 1024C and and/or the loss circuit 1028 (which may correspond to one or more loss components, such as the depth gradient loss function 208, the depth supervision loss function 212, the photometric loss function 224, the adversarial loss function 228, each of FIG. 2, the source consistency loss 430, the target consistency loss 450, the source adversarial loss 460, and/or the target adversarial loss 470, each of FIG. 4) may be used to generate loss components or elements based on generated depth maps (e.g., generated by the depth component 1024A and/or the depth circuit 1026) and/or based on adversarial predictions (e.g., generated by the discriminator component 1024B and and/or the discriminator circuit 1027), as discussed above.

The training component 1024D and the training circuit 1029 may be used to modify, refine, update, or otherwise train one or more model parameters of one or more machine learning models (e.g., the depth model 120 of FIG. 1, the depth model 204 of FIG. 2, the discriminator function 226 of FIGS. 2-3, the encoders 315 of FIG. 3, the decoder 330 of FIG. 3, the source-to-target generators 410A, 410B of FIG. 4, the target-to-source generators 420A, 420B of FIG. 4, the source discriminator 455 of FIG. 4, and/or the target discriminator 465 of FIG. 4) based on generated loss information, as discussed above.

Though depicted as separate components and circuits for clarity in FIG. 10, the depth circuit 1026, the discriminator circuit 1027, the loss circuit 1028, and the training circuit 1029 may collectively or individually be implemented in other processing devices of the processing system 1000, such as within the CPU 1002, the GPU 1004, the DSP 1006, the NPU 1008, and the like.

Generally, the processing system 1000 and/or components thereof may be configured to perform the methods described herein.

Notably, in other aspects, elements of the processing system 1000 may be omitted, such as where the processing system 1000 is a server computer or the like. For example, the multimedia component 1010, the wireless connectivity component 1012, the sensor processing units 1016, the ISPs 1018, and/or the navigation processor 1020 may be omitted in other aspects. Further, aspects of the processing system 1000 may be distributed between multiple devices.

EXAMPLE CLAUSES

Implementation examples are described in the following numbered clauses:

Clause 1: A method, comprising: accessing data from a source domain and data from a target domain; and training a set of machine learning models, based on the data from the source domain and the data from the target domain, to generate depth outputs based on input images, comprising: generating a discriminator output from a discriminator component based at least in part on an input image frame from either the source domain or the target domain; generating an adversarial loss based on the discriminator output and a first ground truth for the input image frame, the first ground truth indicating whether the input image frame is from the source domain or the target domain; and refining one or more machine learning models of the set of machine learning models based on the adversarial loss.

Clause 2: A method according to Clause 1, further comprising generating a depth output from a depth model based on the input image frame, wherein generating the discriminator output comprises processing one or more intermediate features, from the depth model, using the discriminator component.

Clause 3: A method according to Clause 2, further comprising determining a depth loss for the depth model based on the depth output and a second ground truth for the input image frame, the second ground truth comprising depths for a set of pixels of the input image frame, wherein the refining comprises refining the one or more machine learning models of the set of machine learning models based on the adversarial loss and on the depth loss.

Clause 4: A method according to Clause 3, wherein determining the depth loss is performed in response to determining that the input image frame is from the source domain.

Clause 5: A method according to any of Clauses 2-4, further comprising, in response to determining that the first ground truth indicates that the input image frame is from the target domain, refraining from determining a depth loss based on the depth output.

Clause 6: A method according to any of Clauses 2-5, wherein: the depth model comprises one or more encoder subnets and a decoder subnet, and the one or more intermediate features comprise a first intermediate feature generated by a first internal layer of the one or more encoder subnets.

Clause 7: A method according to Clause 6, wherein the one or more encoder subnets comprise either: (i) a single encoder subnet that processes input from both the source domain and the target domain, or (ii) a first encoder that processes input from the source domain and a second encoder that processes input from the target domain.

Clause 8: A method according to Clause 7, wherein: the one or more encoder subnets comprise the first encoder that processes input from the source domain and the second encoder that processes input from the target domain, and the first and second encoders have matching parameters.

Clause 9: A method according to any of Clauses 6-8, wherein: the one or more encoder subnets comprise a first subset of layers prior to the first internal layer and a second subset of layers subsequent to the first internal layer, refining the one or more machine learning models of the set of machine learning models based on the adversarial loss comprises updating the first subset of layers based on the adversarial loss, and the second subset of layers are not updated based on the adversarial loss.

Clause 10: A method according to any of Clauses 2-9, further comprising: updating the depth model based on a first plurality of input image frames from the source domain; and subsequent to updating the depth model based on the first plurality of input image frames, updating at least one of the depth model or the discriminator component based on a second plurality of input image frames from the target domain.

Clause 11: A method according to any of Clauses 2-10, wherein the one or more intermediate features are passed through a gradient reversal layer prior to being input to the discriminator component.

Clause 12: A method according to any of Clauses 1-11, wherein the discriminator component comprises a machine learning model trained to predict whether the input image frame is from the source domain or the target domain.

Clause 13: A method according to any of Clauses 1-11, wherein the discriminator component predicts whether the input image frame is from the source domain or the target domain using one or more domain disparity operations, the one or more domain disparity operations comprising at least one of: a maximum mean discrepancy (MMD) operation, a correlation alignment (CORAL) operation, a contrastive domain discrepancy (CDD) operation, or a Kullback-Leibler (KL) divergence operation.

Clause 14: A method according to any of Clauses 1-13, wherein training the set of machine learning models comprises: training a generator model, based on the data from the source domain and the data from the target domain, to generate pseudo-synthetic data when data from the target domain is used as input to the generator model; and training a depth model to generate the depth outputs, wherein the depth model is trained based on the data from the source domain and is not trained on the data from the target domain.

Clause 15: A method according to any of Clauses 1-14, further comprising, prior to training the set of machine learning models, generating a set of weights for the data from the source domain based at least in part on a first disparity between a distribution of the data from the source domain and a distribution of the data from the target domain, wherein: the set of weights results in a second disparity between a weighted distribution of the data from the source domain and the distribution of the data from the target domain, the second disparity is lower than the first disparity, and the data from the source domain is weighted based on the set of weights when training the set of machine learning models.

Clause 16: A processing system comprising: a memory comprising computer-executable instructions; and one or more processors configured to execute the computer-executable instructions and cause the processing system to perform a method in accordance with any of Clauses 1-15.

Clause 17: A processing system comprising means for performing a method in accordance with any of Clauses 1-15.

Clause 18: A non-transitory computer-readable medium comprising computer-executable instructions that, when executed by one or more processors of a processing system, cause the processing system to perform a method in accordance with any of Clauses 1-15.

Clause 19: A computer program product embodied on a computer-readable storage medium comprising code for performing a method in accordance with any of Clauses 1-15.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method of machine learning, comprising:
    accessing data from a source domain and data from a target domain; and
    training a set of machine learning models, based on the data from the source domain and the data from the target domain, to generate depth outputs based on input images, comprising:
        generating a discriminator output from a discriminator component based at least in part on an input image frame from either the source domain or the target domain;
        generating an adversarial loss based on the discriminator output and a first ground truth for the input image frame, the first ground truth indicating whether the input image frame is from the source domain or the target domain;
        refining one or more machine learning models of the set of machine learning models based on the adversarial loss;
        based on a source domain image, generating a pseudo-target domain image using a source-to-target generator;
        based on the generated pseudo-target domain image, generating a recreated source domain image using a target-to-source generator;
        generating a source consistency loss based on a comparison between the recreated source domain image and the source domain image; and
        updating parameters of the source-to-target generator and the target-to-source generator based on the source consistency loss.

2. The processor-implemented method of claim 1, further comprising generating a depth output from a depth model based on the input image frame, wherein generating the discriminator output comprises processing one or more intermediate features, from the depth model, using the discriminator component.

3. The processor-implemented method of claim 2, further comprising determining a depth loss for the depth model based on the depth output and a second ground truth for the input image frame, the second ground truth comprising depths for a set of pixels of the input image frame, wherein the refining comprises refining the one or more machine learning models of the set of machine learning models based on the adversarial loss and on the depth loss.

4. The processor-implemented method of claim 3, wherein determining the depth loss is performed in response to determining that the input image frame is from the source domain.

5. The processor-implemented method of claim 2, further comprising, in response to determining that the first ground truth indicates that the input image frame is from the target domain, refraining from determining a depth loss based on the depth output.

6. The processor-implemented method of claim 2, wherein:
    the depth model comprises one or more encoder subnets and a decoder subnet, and
    the one or more intermediate features comprise a first intermediate feature generated by a first internal layer of the one or more encoder subnets.

7. The processor-implemented method of claim 6, wherein the one or more encoder subnets comprise either: (i) a single encoder subnet that processes input from both the source domain and the target domain, or (ii) a first encoder that processes input from the source domain and a second encoder that processes input from the target domain.

8. The processor-implemented method of claim 7, wherein:
    the one or more encoder subnets comprise the first encoder that processes input from the source domain and the second encoder that processes input from the target domain, and
    the first and second encoders have matching parameters.

9. The processor-implemented method of claim 6, wherein:
    the one or more encoder subnets comprise a first subset of layers prior to the first internal layer and a second subset of layers subsequent to the first internal layer,
    refining the one or more machine learning models of the set of machine learning models based on the adversarial loss comprises updating the first subset of layers based on the adversarial loss, and
    the second subset of layers are not updated based on the adversarial loss.

10. The processor-implemented method of claim 2, further comprising:
updating the depth model based on a first plurality of input image frames from the source domain; and
subsequent to updating the depth model based on the first plurality of input image frames, updating at least one of the depth model or the discriminator component based on a second plurality of input image frames from the target domain.

11. The processor-implemented method of claim 2, wherein the one or more intermediate features are passed through a gradient reversal layer prior to being input to the discriminator component.

12. The processor-implemented method of claim 1, wherein the discriminator component comprises a machine learning model trained to predict whether the input image frame is from the source domain or the target domain.

13. The processor-implemented method of claim 1, wherein the discriminator component predicts whether the input image frame is from the source domain or the target domain using one or more domain disparity operations, the one or more domain disparity operations comprising at least one of: a maximum mean discrepancy (MMD) operation, a correlation alignment (CORAL) operation, a contrastive domain discrepancy (CDD) operation, or a Kullback-Leibler (KL) divergence operation.

14. The processor-implemented method of claim 1, further comprising, prior to training the set of machine learning models, generating a set of weights for the data from the source domain based at least in part on a first disparity between a distribution of the data from the source domain and a distribution of the data from the target domain, wherein:
the set of weights results in a second disparity between a weighted distribution of the data from the source domain and the distribution of the data from the target domain,
the second disparity is lower than the first disparity, and
the data from the source domain is weighted based on the set of weights when training the set of machine learning models.

15. A processing system comprising:
memory comprising computer-executable instructions; and
one or more processors configured to execute the computer-executable instructions and cause the processing system to perform an operation comprising:
accessing data from a source domain and data from a target domain; and
training a set of machine learning models, based on the data from the source domain and the data from the target domain, to generate depth outputs based on input images, comprising:
generating a discriminator output from a discriminator component based at least in part on an input image frame from either the source domain or the target domain;
generating an adversarial loss based on the discriminator output and a first ground truth for the input image frame, the first ground truth indicating whether the input image frame is from the source domain or the target domain;
refining one or more machine learning models of the set of machine learning models based on the adversarial loss;
based on a source domain image, generating a pseudo-target domain image using a first source-to-target generator;
based on the generated pseudo-target domain image, generating a recreated source domain image using a first target-to-source generator;
generating a source consistency loss based on a comparison between the recreated source domain image and the source domain image; and
updating parameters of the first source-to-target generator and the first target-to-source generator based on the source consistency loss.

16. The processing system of claim 15, the operation further comprising generating a depth output from a depth model based on the input image frame, wherein generating the discriminator output comprises processing one or more intermediate features, from the depth model, using the discriminator component.

17. The processing system of claim 16, the operation further comprising determining a depth loss for the depth model based on the depth output and a second ground truth for the input image frame, the second ground truth comprising depths for a set of pixels of the input image frame, wherein the refining comprises refining the one or more machine learning models of the set of machine learning models based on the adversarial loss and on the depth loss.

18. The processing system of claim 17, wherein determining the depth loss is performed in response to determining that the input image frame is from the source domain.

19. The processing system of claim 16, the operation further comprising, in response to determining that the first ground truth indicates that the input image frame is from the target domain, refraining from determining a depth loss based on the depth output, wherein:
the depth model comprises one or more encoder subnets and a decoder subnet, and the one or more intermediate features comprise a first intermediate feature generated by a first internal layer of the one or more encoder subnets.

20. The processing system of claim 16, wherein:
the depth model comprises one or more encoder subnets and a decoder subnet, and
the one or more intermediate features comprise a first intermediate feature generated by a first internal layer of the one or more encoder subnets.

21. The processing system of claim 20, wherein the one or more encoder subnets comprise either: (i) a single encoder subnet that processes input from both the source domain and the target domain, or (ii) a first encoder that processes input from the source domain and a second encoder that processes input from the target domain.

22. The processing system of claim 21, wherein:
the one or more encoder subnets comprise the first encoder that processes input from the source domain and the second encoder that processes input from the target domain, and
the first and second encoders have matching parameters.

23. The processing system of claim 20, wherein:
the one or more encoder subnets comprise a first subset of layers prior to the first internal layer and a second subset of layers subsequent to the first internal layer,
refining the one or more machine learning models of the set of machine learning models based on the adversarial loss comprises updating the first subset of layers based on the adversarial loss, and
the second subset of layers are not updated based on the adversarial loss.

24. The processing system of claim 16, the operation further comprising:
   updating the depth model based on a first plurality of input image frames from the source domain; and
   subsequent to updating the depth model based on the first plurality of input image frames, updating at least one of the depth model or the discriminator component based on a second plurality of input image frames from the target domain.

25. The processing system of claim 16, wherein the one or more intermediate features are passed through a gradient reversal layer prior to being input to the discriminator component.

26. The processing system of claim 15, wherein the discriminator component comprises a machine learning model trained to predict whether the input image frame is from the source domain or the target domain.

27. The processing system of claim 15, wherein the discriminator component predicts whether the input image frame is from the source domain or the target domain using one or more domain disparity operations, the one or more domain disparity operations comprising at least one of: a maximum mean discrepancy (MMD) operation, a correlation alignment (CORAL) operation, a contrastive domain discrepancy (CDD) operation, or a Kullback-Leibler (KL) divergence operation.

28. The processing system of claim 15, the operation further comprising, prior to training the set of machine learning models, generating a set of weights for the data from the source domain based at least in part on a first disparity between a distribution of the data from the source domain and a distribution of the data from the target domain, wherein:
   the set of weights results in a second disparity between a weighted distribution of the data from the source domain and the distribution of the data from the target domain,
   the second disparity is lower than the first disparity, and
   the data from the source domain is weighted based on the set of weights when training the set of machine learning models.

29. The processing system of claim 15, wherein training the set of machine learning models further comprises:
   based on a target domain image, generating a pseudo-source domain image using a second target-to-source generator;
   based on the generated pseudo-source domain image, generating a recreated target domain image using a second source-to-target generator;
   generating a target consistency loss based on a comparison between the recreated target domain image and the target domain image; and
   updating parameters of the second source-to-target generator and the second target-to-source generator based on the target consistency loss.

30. A processing system comprising:
memory comprising computer-executable instructions; and
one or more processors configured to execute the computer-executable instructions and cause the processing system to perform an operation comprising:
   accessing data from a source domain and data from a target domain; and
   training a set of machine learning models, based on the data from the source domain and the data from the target domain, to generate depth outputs based on input images, comprising:
      generating a discriminator output from a discriminator component based at least in part on an input image frame from either the source domain or the target domain;
      generating an adversarial loss based on the discriminator output and a first ground truth for the input image frame, the first ground truth indicating whether the input image frame is from the source domain or the target domain;
      refining one or more machine learning models of the set of machine learning models based on the adversarial loss;
      based on a target domain image, generating a pseudo-source domain image using a target-to-source generator;
      based on the generated pseudo-source domain image, generating a recreated target domain image using a source-to-target generator;
      generating a target consistency loss based on a comparison between the recreated target domain image and the target domain image; and
      updating parameters of the source-to-target generator and the target-to-source generator based on the target consistency loss.

* * * * *